United States Patent
Nouri et al.

(10) Patent No.: US 11,279,526 B2
(45) Date of Patent: *Mar. 22, 2022

(54) INSIDE OUT METHOD OF MANUFACTURING A CONTAINER WITH A LEAK RESISTANT SEAL

(71) Applicant: Stasher, Inc., Emeryville, CA (US)

(72) Inventors: Katousha Ghaemi Nouri, Los Angeles, CA (US); Paul Maguire, Emeryville, CA (US)

(73) Assignee: Stasher, Inc., Emeryville, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/816,281

(22) Filed: Mar. 12, 2020

(65) Prior Publication Data

US 2020/0207520 A1    Jul. 2, 2020

Related U.S. Application Data

(63) Continuation of application No. 16/566,779, filed on Sep. 10, 2019, now Pat. No. 10,625,906, which is a
(Continued)

(51) Int. Cl.
*B65D 33/25* (2006.01)
*B65D 53/06* (2006.01)
(Continued)

(52) U.S. Cl.
CPC ....... *B65D 33/2508* (2013.01); *B65D 33/243* (2013.01); *B65D 53/06* (2013.01); *B65D 81/3461* (2013.01)

(58) Field of Classification Search
CPC .... A44B 19/32; B65D 33/25; B65D 33/2508; B65D 33/2541; B65D 33/00; B65D 3/24;
(Continued)

(56) References Cited

U.S. PATENT DOCUMENTS 2,320,583 A    6/1943    Forro
2,500,363 A    3/1950    Koeppel
(Continued)

FOREIGN PATENT DOCUMENTS

EP    0958909    11/1999
FR    2302247    9/1976
(Continued)

OTHER PUBLICATIONS

International Search Report Received in PCT Application Serial No. PCT/US14/00032, dated Jul. 30, 2014, 1 page.
(Continued)

*Primary Examiner* — Robert F Long
*Assistant Examiner* — Eduardo R Ferrero
(74) *Attorney, Agent, or Firm* — Quarles & Brady LLP

(57) ABSTRACT

Embodiments include a method of manufacturing a container with a leak resistant seal. The method includes forming an elastomer or a plastic or any combination thereof into a container inside out by forming an outside portion of the container on an internal surface of the container before inverting the container and forming an inside portion of the container on an external surface of the container before inverting the container. In embodiments, the method includes forming or coupling a leak resistant seal on the external surface of the container before inverting the container. The leak resistant seal provides access to the inside portion of the container when the leak resistant seal is open after inverting the container and holds at least liquid internal to the container when applying an external force to the container without use of an external structure to keep the leak resistant seal closed after inverting the container.

30 Claims, 16 Drawing Sheets

Related U.S. Application Data continuation-in-part of application No. 16/193,978, filed on Nov. 16, 2018, now Pat. No. 10,407,217.

(51) Int. Cl.
*B65D 33/24* (2006.01)
*B65D 81/34* (2006.01)

(58) Field of Classification Search
CPC ...... B65D 33/243; B65D 33/02; B65D 53/06; B65D 53/00; B65D 81/3461; B29C 43/14; B29C 43/18; B29C 45/0055; B29C 45/14336; B29C 45/14; B29C 2045/14459; B29L 2031/712
See application file for complete search history.

(56) References Cited

U.S. PATENT DOCUMENTS

| | | | |
|---|---|---|---|
| 2,519,290 A | 8/1950 | Saltz | |
| 2,674,289 A | 4/1954 | Silverman | |
| 2,746,502 A | 5/1956 | Camprubi | |
| 2,780,261 A | 2/1957 | Svec et al. | |
| 3,149,747 A | 9/1964 | Burgess | |
| 3,275,053 A | 9/1966 | Kabana | |
| 3,280,870 A | 10/1966 | Bundy | |
| 3,326,399 A | 6/1967 | Ausnit | |
| 3,338,285 A | 8/1967 | Jaster et al. | |
| 3,417,675 A | 12/1968 | Ausnit | |
| 3,808,649 A | 5/1974 | Ausnit | |
| 3,945,403 A | 3/1976 | Noguchi | |
| 3,948,705 A | 4/1976 | Ausnit | |
| 4,159,728 A | 7/1979 | Kraus et al. | |
| 4,193,152 A | 3/1980 | Seibold | |
| 4,199,845 A | 4/1980 | Ausnit | |
| 4,341,575 A | 7/1982 | Herz | |
| 4,397,404 A | 8/1983 | Blanchette | |
| 4,512,474 A | 4/1985 | Harding | |
| 4,736,496 A | 4/1988 | Fisher et al. | |
| 4,842,670 A | 6/1989 | Callis et al. | |
| 4,845,781 A | 7/1989 | Strickland et al. | |
| 4,912,616 A | 3/1990 | Van Erden | |
| 4,925,318 A | 5/1990 | Sorensen | |
| 4,929,487 A | 5/1990 | Tilman et al. | |
| 5,000,363 A | 3/1991 | Linquist | |
| 5,017,021 A | 5/1991 | Simonsen et al. | |
| 5,031,768 A | 7/1991 | Fischer | |
| 5,046,659 A | 9/1991 | Warburton | |
| D323,979 S | 2/1992 | Forman et al. | |
| 5,094,707 A | 3/1992 | Bruno | |
| 5,123,535 A | 6/1992 | Patnode et al. | |
| 5,161,286 A | 11/1992 | Herrington et al. | |
| 5,235,731 A | 8/1993 | Shimamura et al. | |
| 5,253,395 A | 10/1993 | Yano | |
| 5,486,051 A | 1/1996 | May | |
| 5,577,305 A | 11/1996 | Johnson | |
| 5,584,408 A | 12/1996 | Orkisz | |
| 5,665,301 A | 9/1997 | Alanko | |
| 5,686,304 A | 11/1997 | Codner | |
| 5,709,915 A | 1/1998 | Tomic et al. | |
| 5,729,876 A | 3/1998 | Johnson | |
| 5,802,677 A | 9/1998 | Dorman et al. | |
| 6,049,938 A | 4/2000 | Jimison | |
| 6,420,037 B1 | 7/2002 | Tsuji et al. | |
| 6,572,267 B1 | 6/2003 | Forman | |
| 6,625,955 B2 | 9/2003 | Aylward | |
| 6,632,164 B1 | 10/2003 | Warburton-Pitt | |
| 6,761,481 B1 | 7/2004 | Bois | |
| 6,786,712 B2 | 9/2004 | Cisek | |
| 6,954,969 B1 | 10/2005 | Sprehe | |
| D512,650 S | 12/2005 | Dapsance | |
| 7,291,370 B2 | 11/2007 | Gipson et al. | |
| 7,316,052 B2 | 1/2008 | Pawloski et al. | |
| 7,585,111 B2 | 9/2009 | Turvey et al. | |
| 7,681,732 B2 | 3/2010 | Moehlenbrock et al. | |
| 7,793,391 B2 | 9/2010 | Sprehe | |
| 7,891,514 B1 | 2/2011 | Walsh et al. | |
| 7,904,996 B2 | 3/2011 | Dobreski et al. | |
| 8,157,123 B2 | 4/2012 | Tucker et al. | |
| D724,441 S | 3/2015 | Fukuda | |
| 9,371,153 B1 | 6/2016 | Nouri | |
| 10,407,217 B1* | 9/2019 | Nouri | B29C 43/18 |
| 10,625,906 B1* | 4/2020 | Nouri | B29C 45/0055 |
| 2003/0215163 A1 | 11/2003 | Schneider et al. | |
| 2003/0228078 A1 | 12/2003 | Clune et al. | |
| 2004/0134166 A1 | 7/2004 | Ausnit | |
| 2004/0136617 A1 | 7/2004 | Gerrits | |
| 2004/0144781 A1 | 7/2004 | Dees et al. | |
| 2005/0247709 A1 | 11/2005 | Atkins et al. | |
| 2006/0029299 A1 | 2/2006 | Share et al. | |
| 2006/0034551 A1 | 2/2006 | Linneweil | |
| 2006/0083833 A1 | 4/2006 | Pezzana et al. | |
| 2006/0289550 A1 | 12/2006 | Guardigli | |
| 2007/0086683 A1 | 4/2007 | Yeager | |
| 2007/0095848 A1 | 5/2007 | Galland et al. | |
| 2007/0183692 A1 | 8/2007 | Pawloski | |
| 2008/0118609 A1 | 5/2008 | Harlfinger | |
| 2009/0106953 A1 | 4/2009 | Wittig | |
| 2009/0110335 A1 | 4/2009 | Leboeuf | |
| 2009/0134179 A1 | 5/2009 | Kidd et al. | |
| 2009/0134180 A1 | 5/2009 | Kidd | |
| 2009/0223966 A1 | 9/2009 | Kidd et al. | |
| 2010/0021091 A1 | 1/2010 | Fratti et al. | |
| 2010/0135600 A1 | 6/2010 | Dacauchuis et al. | |
| 2010/0218690 A1 | 9/2010 | Huber et al. | |
| 2011/0038564 A1 | 2/2011 | Slansky | |
| 2011/0103717 A1 | 5/2011 | Kasai | |
| 2011/0268373 A1 | 11/2011 | Polland | |
| 2012/0008880 A1 | 1/2012 | Toth | |
| 2012/0037618 A1 | 2/2012 | Perez | |
| 2012/0106874 A1 | 5/2012 | Pawloski | |
| 2012/0152943 A1 | 6/2012 | Leoncavallo et al. | |
| 2013/0091667 A1 | 4/2013 | Zerfas et al. | |
| 2013/0105352 A1 | 5/2013 | Munguia | |
| 2013/0243354 A1 | 9/2013 | Lytle | |
| 2014/0270587 A1 | 9/2014 | Schreiter et al. | |
| 2017/0265603 A1 | 9/2017 | Ronsen | |
| 2018/0029324 A1 | 2/2018 | Cobler | |
| 2018/0251267 A1 | 3/2018 | Finell | |

FOREIGN PATENT DOCUMENTS

| | | |
|---|---|---|
| JP | H08217093 | 8/1996 |
| JP | 2001031138 | 2/2001 |
| JP | 2010168098 | 8/2010 |

OTHER PUBLICATIONS

International Search Report Received in PCT Application Serial No. PCT/US16/20279, dated Jun. 9, 2016, 12 pages.

Supplementary European Search Report received in EP16759364, dated Sep. 26, 2018, 8 pages.

*Zip Top, LLC v. Stasher, Inc.* Patent Owner Response to Petition for Inter Partes Review of U.S. Pat. No. 9,371,153, filed on Apr. 22, 2019, in IPR2018-01216.

*Zip Top, LLC v. Stasher, Inc.* Petition for Inter Partes Review of U.S. Pat. No. 9,371,153, filed on Jun. 6, 2018, as IPR2018-01216.

*Zip Top, LLC v. Stasher, Inc.* Patent Owner Preliminary Response for Inter Partes Review of U.S. Pat. No. 9,371,153, filed on Oct. 19, 2018 in IPR2018-01216.

*Zip Top, LLC v. Stasher, Inc.* Patent Owner *Supplemental* Preliminary Response for Inter Partes Review of U.S. Pat. No. 9,371,153, filed on Nov. 20, 2018 in IPR2018-01216.

"Handbook of molded and extruded rubber", Goodyear Tire and Rubber Company, Akron (1949), 47 pages.

"Zip Top Containers", retrieved from https://vimeo.com/259047617, undated, 3 pages.

Declaration of Katousha Nouri in Support of Patent Owner Preliminary Response to Petition for Inter Partes Review, filed in IPR2018-01216, dated Oct. 16, 2018.

(56) References Cited

OTHER PUBLICATIONS

International Search Report Received in PCT Application Serial No. PCT/US2019/061455, dated Jan. 14, 2020, 7 pages.

* cited by examiner

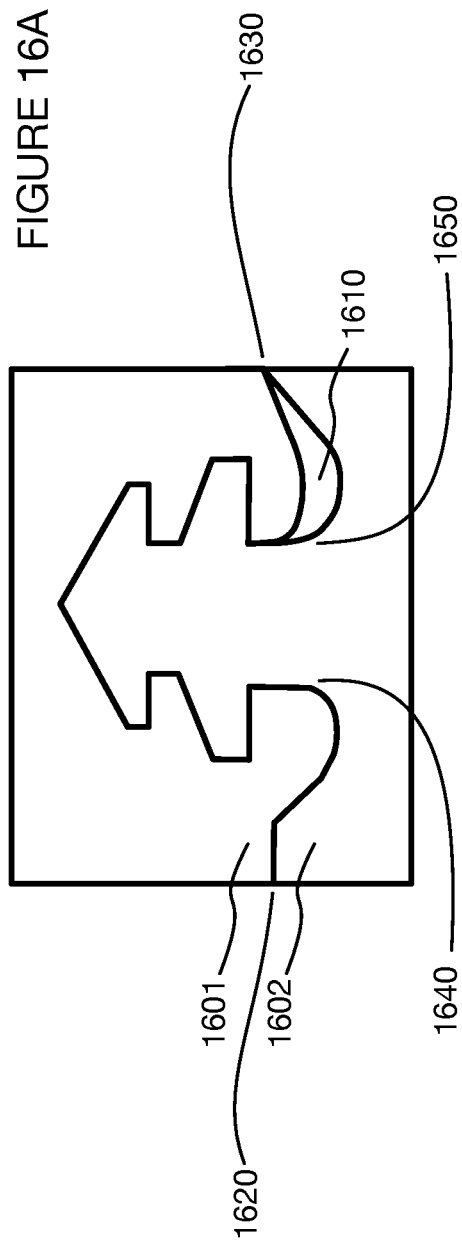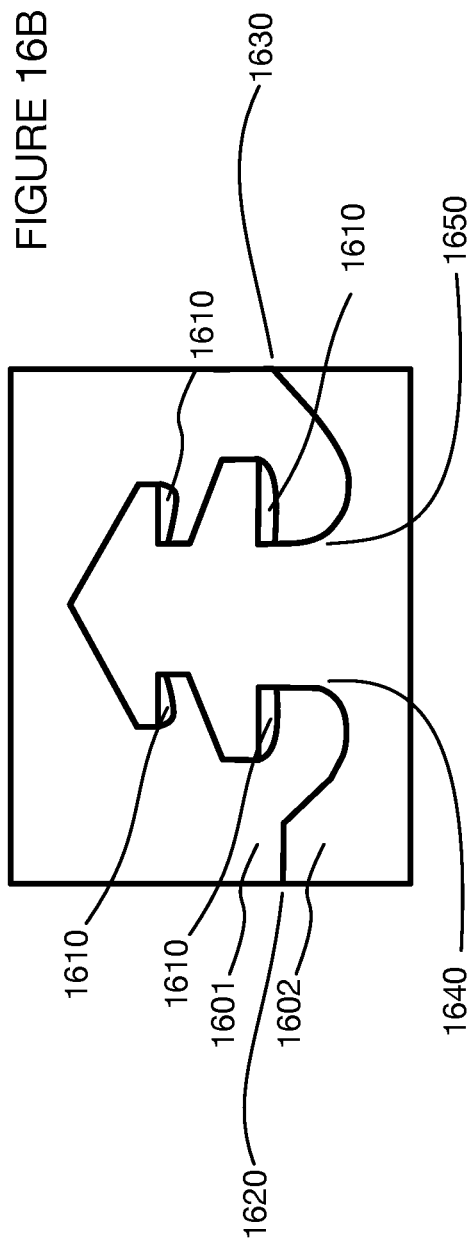

INSIDE OUT METHOD OF MANUFACTURING A CONTAINER WITH A LEAK RESISTANT SEAL

This application is continuation of U.S. Utility patent application Ser. No. 16/566,779, filed 10 Sep. 2019, and is a continuation-in-part of U.S. Utility patent application Ser. No. 16/193,978, filed 16 Nov. 2018, issued as U.S. Pat. No. 10,407,217, the specifications of which are hereby incorporated herein by reference.

BACKGROUND OF THE INVENTION

Field of the Invention

Embodiments of the invention generally relate to the field of manufacturing of storage and transport bags and containers and seals for these bags and containers. More particularly, but not by way of limitation, one or more embodiments relate to an inside out method of manufacturing a container with a leak resistant seal that includes forming an elastomer or a plastic or any combination thereof into a container inside out to facilitate manufacturing, for example using less steps and to provide a seal with enhanced leak resistance, for example that can maintain a seal that resists leakage of liquids and solids from the container during storage and transport without the aid of an external structure to maintain the seal.

Description of the Related Art

Sealable bags and containers have been made for many years but are difficult to manufacture when using seals that must engage to remain closed. For example, manufacturing sealable plastic bags generally requires extruded parts, including seals that may be part of the container or later bonded to the container wherein the containers are cut with hot knives to create sealed edges. Plastic bags are generally created for single use and have chemicals that are undesirable for food storage for example. The resulting number of plastic bags thrown away on an annual basis is very high. Elastomeric bags, which have been made for reuse have generally been molded, for example with compression molding or liquid injection molding. The resulting elastomeric bags are highly elastic compared to plastic bags and their seals are generally bonded or molded into the inner portion of the bag. Elastomeric sealable bags are more durable than their plastic throwaway counterparts and a single reusable bag can save hundreds if not thousands of plastic bags. For example, both Munguia in US Patent Publication 2013/0105352 and LeBoeuf in US Patent Publication 2009/0110335 teach silicone food storage bags with seals. The problems with both of these devices is that they require external clamps or other external structures to seal the bags because their seals are not strong enough to be leak resistant. Svec, U.S. Pat. No. 2,780,261 shows one embodiment that can hold liquid inside of it, namely as shown and described with respect to FIG. 7. This is another example of a device that requires a structure external to the seal, namely sidewalls that allow liquid in the container to extend up and around the seal, i.e., which requires more material in the manufacturing process and provides hard to clean areas that are not easy to clean or even remove liquids and solids from when the container is inverted for example. Other attempts to make a silicone container with a leak resistant seal have failed including U.S. Patent Application Publication No. 2014/0270579, also published as WO 2014/163712, which includes a seal that readily leaks on both ends when configured without a "tightening mechanism" attached at both ends of the seal.

A limitation of the existing sealable bags is that the integrated seal designs provide relatively weak sealing force based on the elastic nature of elastomers. Plastic bags provide a weak sealing force, but for a different reason, mainly because the seals are extremely small, with ridges that are approximately 10 times thinner than a human fingernail, 0.1 mm. For example, Ziploc® bags are closeable, but they are not leak proof. This lack of leak resistance is a consequence of the relatively small sealing area and the simple track and groove shapes of the Ziploc® seal. To make the ridges leak resistant for storage and not for undergoing internal forces, the rigidity of the seal, when made this small has to be outside of the Shore A scale and well into the Shore D scale, i.e., 45-85 Shore D, typically in the 45-60 Shore D range and usually above 50 Shore D. In addition, extrusion imperfections when making the seals with this rigidity yield slight variations in the thickness of the seal and this provides a lower yield of containers that have acceptable leak resistance. Attempts to make the seals strong require use of sliders to open and close the bags, i.e., to allow children or elderly or weak individuals to open and close the bags. Sliders generally provide an opening on the end of the slider that leaks. In these devices, extra structure must be utilized to form a seal around the portion of the slider that maintains a separation in the seal, i.e., to seal the slider portion itself from leaking. Sliders also provide a choking hazard for children when they are dislodged.

This difficulty in providing an integrated leak resistant seal was taught in 1946 by Koeppel in U.S. Pat. No. 2,500,363. As Koeppel states: "Closures for containers of this nature have been formed in various ways, but when the opening in the bag or container is made sufficiently large to receive ice cubes or relatively large lumps of ice it is difficult to seal the opening effectively. Efforts have been made to overcome this difficulty by providing the container with a thickened portion about the mouth of the opening with complementary zig-zag or tongue and groove surfaces to form a seal. However, even such constructions are ineffective to prevent leakage unless they are pressed together with considerable force." Koeppel then teaches a design using an external mechanical clip attached to a bag to provide the necessary sealing force. In this sense Koeppel arrives at a similar solution to LeBoeuf using an external clasp.

Silverman, U.S. Pat. No. 2,674,289 teaches a rubber container, namely a tobacco pouch that is molded inside out. This eliminates the step of bonding a seal to the container and simplifies the mold since the container can be inverted after molding. However, Silverman's seal tapers at the ends and when inverted for use, results in a complete lack of sealing force at the ends since the seal tapering produces no contact for ridges and indentations at the ends of the seal i.e., no seal at the ends. Silverman's design thus requires rivets, leather jacketing and a separate zipper e.g., external structures, to hold the seal together. Silverman also requires extra manufacturing steps of riveting the ends of the seal, etc., and is not leak resistant unless the external structure, e.g., rivets, are utilized.

While use of external clips or mechanical clasps can provide seals, they are less convenient for the user and they require additional manufacturing cost and complexity. Molding elastic containers inside out to simplify mold design to date has not provided any advantage for manufacture, again, since additional structure and steps to add that structure are required. Therefore, there is a need for an inside out method of manufacturing a container with a leak resistant seal, which forms the container and seal for example in as little as one step and which results in a seal that does not require such additional elements to enhance sealing force to remain leak resistant for example when external forces are applied to the container or when the container is inverted.

BRIEF SUMMARY OF THE INVENTION

Embodiments of the invention generally relate to an inside out method of manufacturing a container with a leak resistant seal that includes forming an elastomer or a plastic or any combination thereof into a container inside out. In at least one embodiment, the method includes forming an outside portion of the container on an internal surface of the container before inverting the container and forming an inside portion of the container on an external surface of the container before inverting the container. By way of at least one embodiment, the method includes forming or coupling a leak resistant seal on the external surface of the container before inverting the container. In at least one embodiment, the leak resistant seal provides access to the inside portion of the container when the leak resistant seal is open after inverting the container and holds at least liquid internal to the container when applying an external force to the container without use of an external structure to keep the leak resistant seal closed after inverting the container.

One or more embodiments includes inverting the external surface of the container and the leak resistant seal with the internal surface of the container such that the inside portion of the container and the leak resistant seal are located within the container and the outside portion of the container is located outside of the container.

In at least one embodiment of the invention, forming the inside portion of the container on the external surface of the container includes forming a gap on the external surface between a first side of the leak resistant seal and a second side of the leak resistant seal that engage each other after inverting the container. In one or more embodiments, the gap provides an abutment that each end of the first side and second side of the leak resistant seal contact to keep the leak resistant seal from leaking when the applying the external force to the container occurs. In one or more embodiments, the gap is less than or equal to a thickness of the leak resistant seal.

By way of at least one embodiment of the invention, the gap or each end of the first side and second side of the leak resistant seal include at least one gap seal, wherein the at least one gap seal is a protrusion that protrudes from the gap or from at least one of or from each end of the first side and second side of the leak resistant seal. In one or more embodiments, the protrusion provides a wandering path along the gap that provides a longer distance for water to travel, and thus increases leak resistance. In one or more embodiments, the material that forms the gap is thick enough, so that when inverted compresses the seal ends together and compresses the protrusions against the gap or male or female portions of the seal or any combination thereof to increase the leak resistance. The method of forming a gap between the seal ends and gap seals on the ends with forming a thickness of the material at the gap thick enough to compress the seal and gap seal is unknown in the art.

In one or more embodiments of the invention, forming or coupling the leak resistant seal includes utilizing a leak resistant seal with a first seal portion and a second seal portion that couple with each other along a boundary to seal the container and decouple from each other along the boundary to open the container.

In at least one embodiment of the invention, the first seal portion and the second seal portion are at least 1 mm thick, or at least 2 mm thick, or at least 3 mm thick, or greater than 3 mm thick.

According to one or more embodiments of the invention, the boundary defines a path of contact between the first seal portion and the second seal portion that is at least 2 times a horizontal distance between a start of the path and an end of the path. In one or more embodiments, the path is at least 2.5 times the horizontal distance between the start of the path and the end of the path, or at least 3 times, or at least 4 times or at least 5 times the horizontal distance between the start of the path and the end of the path. Other metrics for measuring the seal may include measuring the path of the boundary for the seal starting at a point where the seal diverges from the base of the seal, or a flat portion of the seal, along the path of contact between each side of the seal and to a point next to the original starting point back on the flat portion of the seal. This metric for the winding path may yield ratios of at least 4, 5, 6, 7, 8, 9, or greater than 10. In addition, the seal may have gaps within it to enable the seal to open more easily. The gaps may be symmetrical on each side of any protrusion or cavity for example or may be asymmetrical. By including a gap on one side of the protrusion, the seal may be opened more easily from the side having the gap for example.

In at least one embodiment of the invention, the first seal portion and the second seal portion include at least one corresponding protrusion or indentation that includes a geometric shape that is wider than another portion of the at least one corresponding protrusion or indentation. The seal may also include gaps meaning that the shapes of ridges and recesses that correspond to one another, i.e., that fit into one another, whether in full contact across the entire boundary or not, may be of different shapes.

In one or more embodiments of the invention, utilizing the leak resistant seal includes utilizing the protrusion or the indentation having a height of at least 2 mm and utilizing the geometric shape having a width of at least 1 mm thicker than the protrusion or the indentation.

By way of at least one embodiment, utilizing the leak resistant seal includes utilizing the protrusion or the indentation having a height of at least 2 mm and utilizing the geometric shape having a width of at least 2 mm thicker than the protrusion or the indentation.

According to one or more embodiments, utilizing the leak resistant seal includes utilizing two or more of the at least one corresponding protrusion and the at least one corresponding indentation in the leak resistant seal.

At least one embodiment of the invention includes forming the container with a width near the leak resistant seal that is larger than an opposing width of the container away from the leak resistant seal. In one or more embodiments, the leak resistant seal includes a first side and a second side that engage each other. In at least one embodiment, the first side includes a different average thickness than the second side. In one or more embodiments, the first side is made from a different material than the second side. In at least one embodiment, the first side includes a different hardness value than the second side.

By way of one or more embodiments, the leak resistant seal is made from a different material than a remaining portion of the container that does not include the leak resistant seal. In at least one embodiment of the invention, the leak resistant seal includes a different hardness value than the remaining portion of the container that does not include the leak resistant seal.

One or more embodiments of the invention include forming the elastomer into the container with a hardness of between 70 and 80 on a Shore A durometer scale. At least one embodiment of the invention includes forming the elastomer into the container with a hardness of between 40 and 90, or at least less than or equal to 100 on a Shore A durometer scale.

In one or more embodiments of the invention, forming the container includes forming the leak resistant seal at opposing edges of the container that are at least as thick as the leak resistant seal between the opposing edges. By way of at least one embodiment, forming the elastomer into the container includes transfer molding, plastic injection molding, liquid injection molding or compression molding.

One or more embodiments include utilizing an uncured, heat curable elastomer, wherein forming the elastomer into the container includes heat curing the container.

At least one embodiment of the invention includes forming the container in one molding step without attaching any material to the container after the molding. In other embodiments, multiple parts may be formed before bonding them together and before inverting the container. One example would be to separately mold a top enclosure and bottom enclosure, each of which define a portion of the volume that results in the inner portion of the container, then bond them together and then invert the container inside out. This requires an extra step of coupling the parts together, e.g., via bonding, wherein when the top enclosure and bottom enclosure are formed in a mold at the same time, they are coupled together with the same material in one step. A container still has two parts designated as the top enclosure and bottom enclosure that are merely designations of sides of the container in this example. Thus, "coupled to" covers a container made from two separate parts or two parts formed at the same time and coupled within the mold, i.e., during the molding process.

In one or more embodiments, coupling the leak resistant seal includes gluing, bonding or attaching the leak resistant seal to the container to couple the leak resistant seal by co-molding the container and the leak resistant seal together or by over-molding the container to the leak resistant seal or by over-molding the leak resistant seal to the container.

At least one embodiment of the invention includes forming the leak resistant seal without bonding or gluing opposing sides of the leak resistant seal at opposing ends of the leak resistant seal, i.e., so that there is a gap between one side of the seal and the other at the ends, wherein when inverted inside out, the two seal portions eliminate the gap to provide a leak resistant seal. One or more embodiments of the invention include forming a bottom on the container such that the container may stand upright.

At least one embodiment of the invention includes forming the container with a thickness of 0.6 mm that increases to 1.8 mm at opposing sides of the leak resistant seal at opposing ends of the container.

One or more embodiments of the invention include forming the container with a thickness of between 0.3 and 0.9 mm that increases to 1.2 to 2.4 mm at opposing sides of the leak resistant seal at opposing ends of the container.

BRIEF DESCRIPTION OF THE DRAWINGS

The above and other aspects, features and advantages of at least one embodiment of the invention will be more apparent from the following more particular description thereof, presented in conjunction with the following drawings, wherein:

FIG. 16A shows an alternate embodiment of a seal profile having a gap on the external portion of the container to make the container easier to open from the outside than from the inside. FIG. 16B shows a second alternate embodiment of a seal profile having gaps.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
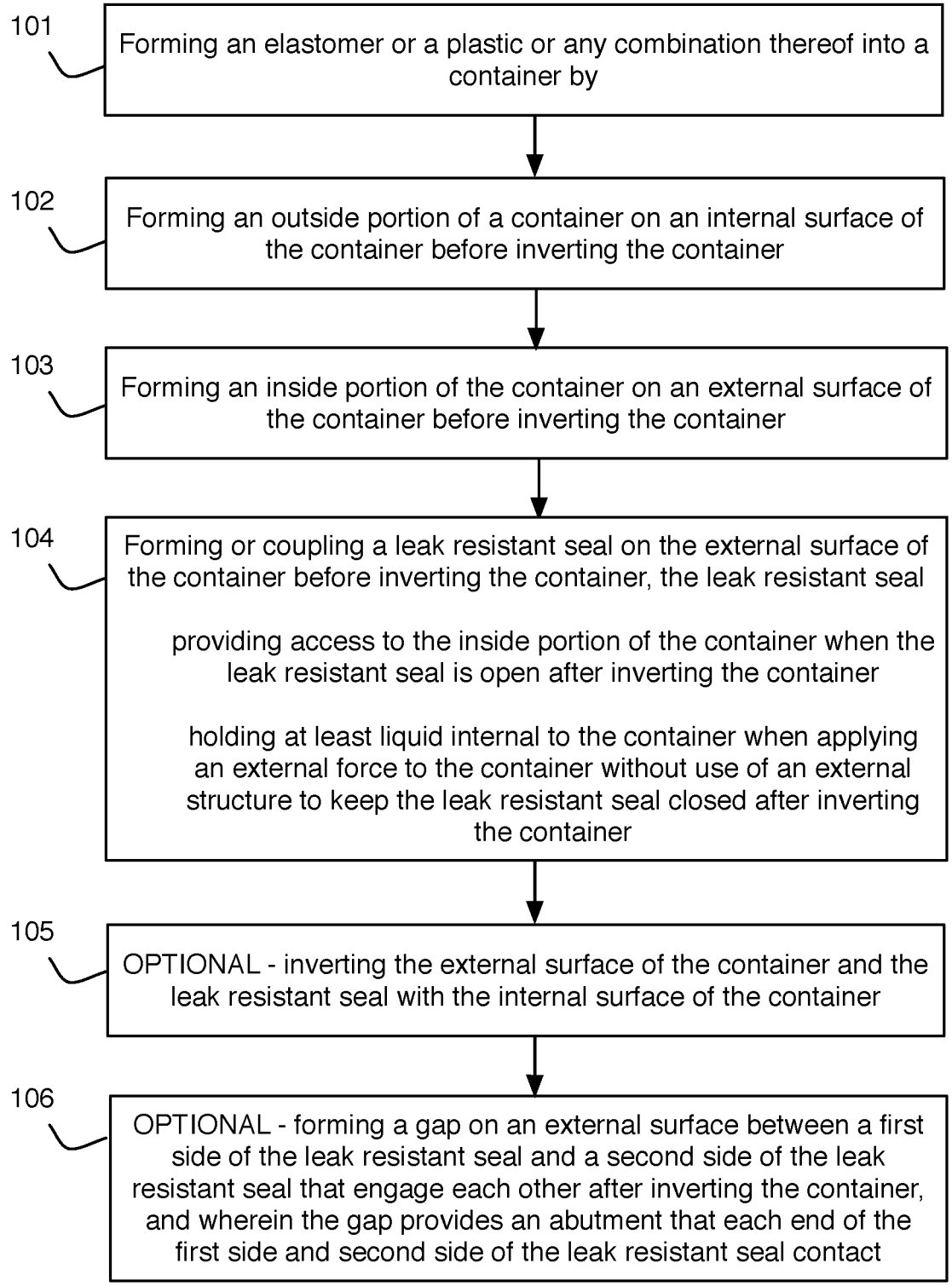
FIG. 1 illustrates an exemplary flowchart of the method of manufacturing a container with a leak resistant seal.
Figure 2:
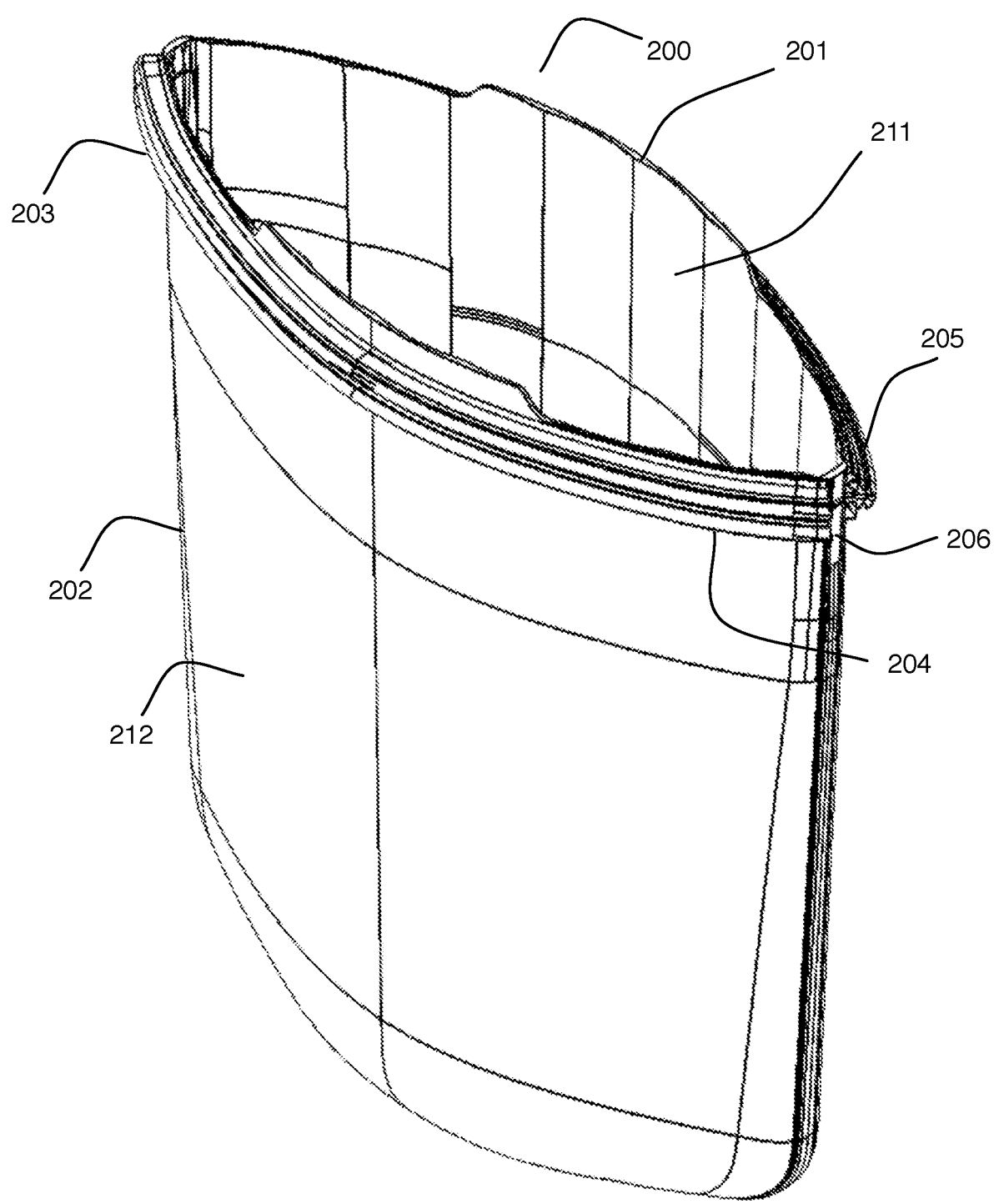
FIG. 2 shows a perspective view of the container formed inside out with the leak resistant seal on the outside.

FIG. 1 illustrates an exemplary flowchart of the inside out method of manufacturing a container with a leak resistant seal, and FIG. 2 shows a perspective view of the container after manufacture and before the container is inverted, i.e., before being configured for use as a container with a leak resistant seal, according to one or more embodiments of the invention. Embodiments of the invention generally relate to a method of manufacturing a container 200 with a leak resistant seal 203 that includes 101 forming an elastomer or a plastic, or thermoplastic elastomers, which are plastics that can behave in some ways like elastomers depending on their specific characteristics, or any combination thereof into a container 200, for example inside out. In at least one embodiment, the method includes 102 forming an outside portion 201 of the container 200 on an internal surface 211 of the container 200 before inverting the container 200, and 103 forming an inside portion 202 of the container on an external surface 212 of the container before inverting the container 200. By way of at least one embodiment, the method includes 104 forming or coupling a leak resistant seal 203 on the external surface 212 of the container before inverting the container. In at least one embodiment, the leak resistant seal 203 providing access to the inside portion 202 of the container 200 when the leak resistant seal 203 is open after inverting the container 200, and when the container is sealed holding at least liquid, and/or another substance, internal to the container 200 when applying an external force to the container 200 without use of an external structure to keep the leak resistant seal 203 closed after inverting the container 200. Part of the manufacturing process may optionally include inverting the external surface of the container and the leak resistant seal with the internal surface of the container at 105. In other embodiments, the container may be delivered inside out where the end user or customer inverts the container. In one or more embodiments, part of the manufacturing process may optionally include forming a gap on an external surface between a first side of the leak resistant seal and a second side of the leak resistant seal that engage each other after inverting the container, and wherein the gap provides an abutment that each end of the first side and second side of the leak resistant seal contact at 106. By way of at least one embodiment, the leak resistant seal 206 provides access to the inner portion of the container 200 and allows the container 200 to hold the at least liquid internally with a liquid tight seal for storage and during transport for example.

Figure 13:
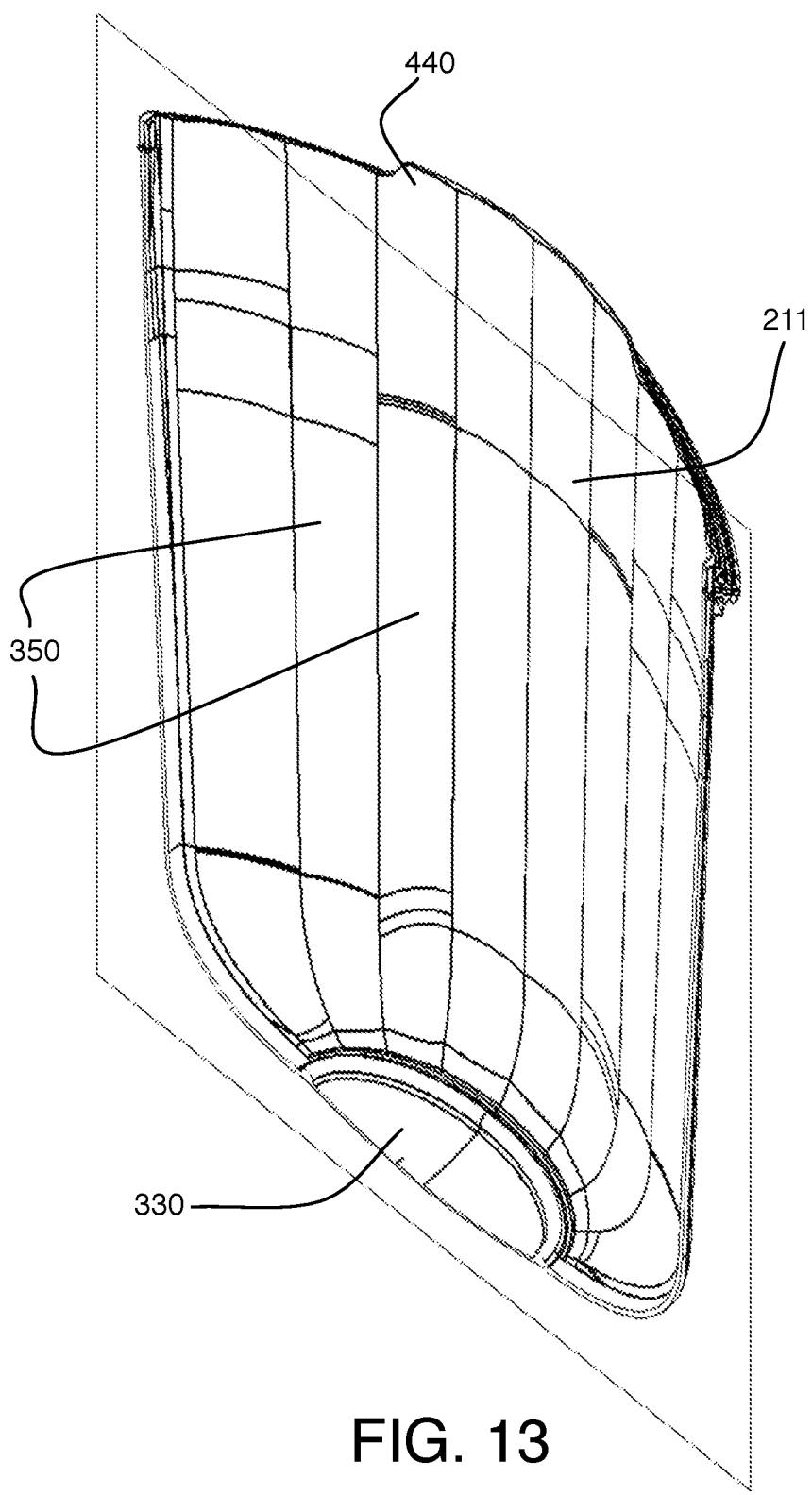
FIG. 13 shows a cross-section view of the container, namely an internal surface of the container before being inverted showing the flutes that reside on the outside of the container after the container is inverted. Flutes increase the stiffness of the container and allow the container to stand upright.
Figure 14:
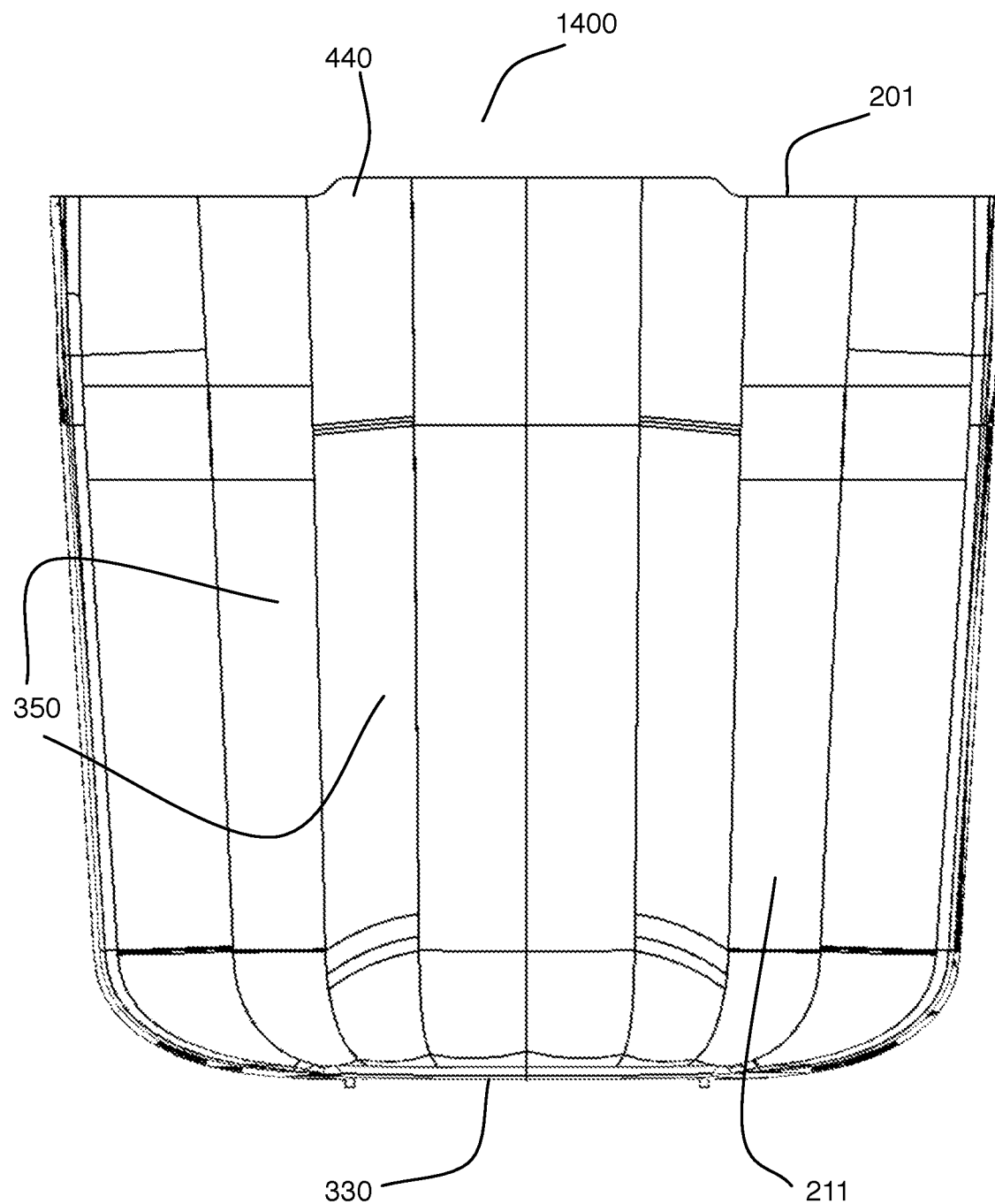
FIG. 14 shows a front view of the container after being inverted.

FIG. 13 shows a cross-section view, specifically an upper perspective cross-section view, of the internal surface of the container before being inverted and FIG. 14 shows a front view of the container after being inverted, according to one or more embodiments of the invention. As shown in FIG. 13, the container 200 may include a tab 440 and flutes 350 on the internal surface 211, i.e., that becomes the outside portion 201 of the container after the container is inverted.

As shown in FIG. 14, one or more embodiments of the invention includes inverting the external surface 212 of the container 200 and the leak resistant seal 203 (not shown in FIG. 14) with the internal surface 211 of the container 200 such that the inside portion 202 of the container and the leak resistant seal 203 are located within the container 200 and the outside portion 201 of the container is located outside of the container 200, to form a container 1400 ready for use. In one or more embodiments, as shown in FIG. 14, when the container 200 is inverted, the tabs 440 and the flutes 350 are shown on the outside portion 201. In one or more embodiments, the enclosures shown in FIGS. 13 and 14 may be formed separately and coupled to one another via bonding or coupled to one another at the same time as forming the enclosures, i.e., in a mold. In any case, the container as a whole has two enclosure parts that define an inner volume, whether merely a designation of a single container when formed simultaneously, i.e., coupled to one another during molding, or whether formed separately and then coupled to one another, i.e., via bonding. The parts may be formed as shown in FIGS. 13 and 14 or in any other manner, e.g., could be made in at least two parts across the cross-section plan shown in FIG. 3, with a mirror image part on the other side of the plane that are then bonded for example.

Figure 3:
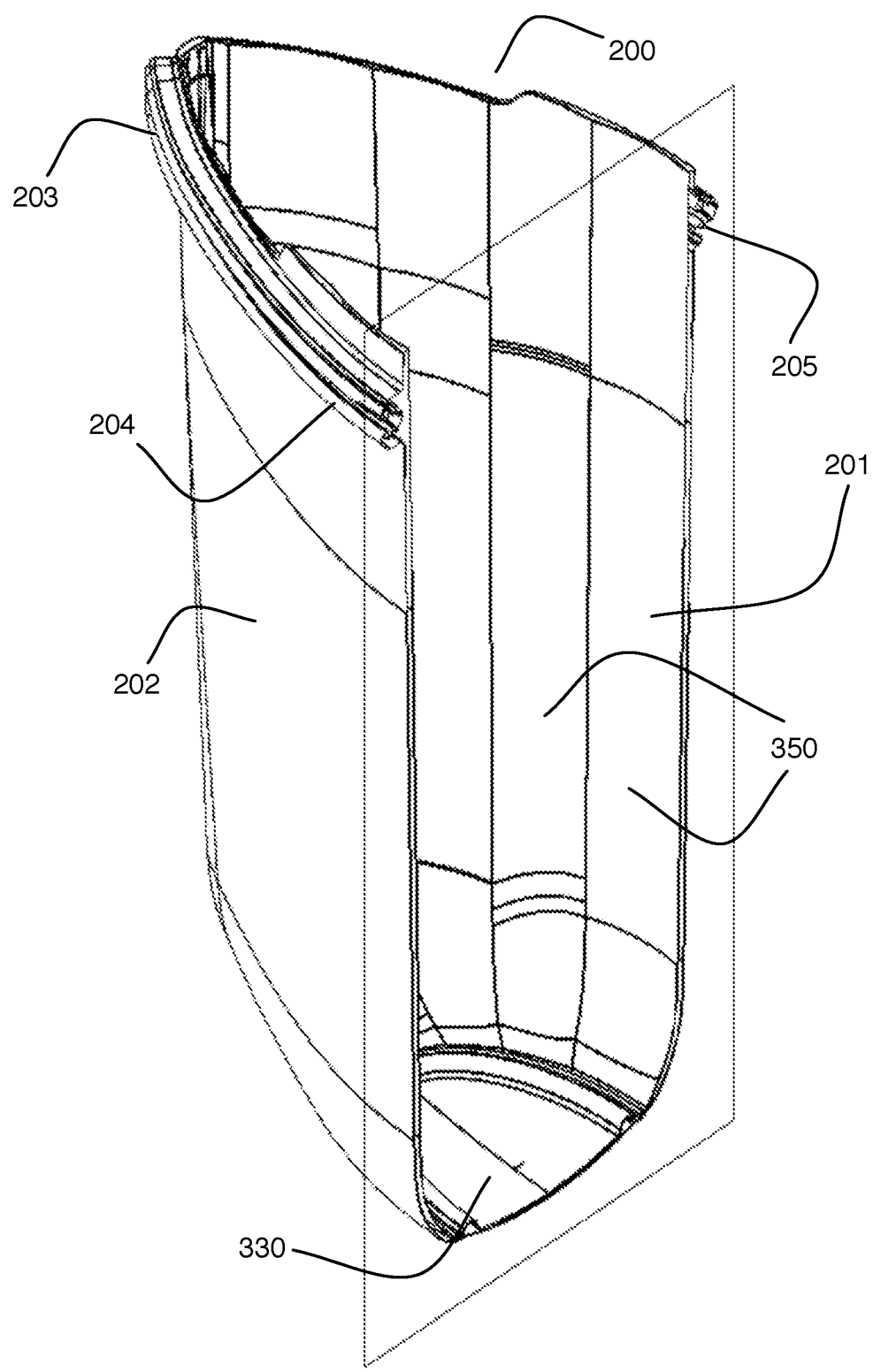
FIG. 3 shows a cross-section view of a left side of the container formed inside out.

FIG. 3 shows a cross-section view of a left side of the container before the container is inverted, according to one or more embodiments of the invention. As shown in FIG. 3, in at least one embodiment, the container 200 includes the leak resistant seal 203 with a first side 204 and a second side 205. One or more embodiments of the invention include forming a bottom 330, such as a rim or feet, on the container 200 such that the container 200 may stand upright. As such, in at least one embodiment, when the container 200 is inverted, the bottom 330 protrudes or faces outward away from the container 200, and after being inverted the bottom 330 protrudes or faces inward towards and into the container 200. According to one or more embodiments, before the container 200 is inverted, the edges of the leak resistant seal 203 on both edges of the container 200 protrude or face outward away from the container 200, and after being inverted, the edges of the leak resistant seal 203 protrude or face inward towards each other in an inner portion of the container 200.

By way of one or more embodiments, the flutes 350 of the container 200 may end at a predetermined distance from a top edge of the container 200, wherein the top edge is opposite that of the bottom 330. For example, in at least one embodiment, the predetermined distance may be 15 mm, less than 15 mm or more than 15 mm. According to one or more embodiments of the invention, the flutes 350 end at the predetermined distance from the top edge of the container 200 in order to avoid interference when inverting the container 200 along the edge to make the seal with the leak resistant seal 203.

In one or more embodiments, the leak resistant seal 203 includes a first side 204 and a second side 205 that engage each other. In at least one embodiment, the first side 204 may include a different average thickness than the second side 205. In one or more embodiments, the first side 204 may be made from a different material than the second side 205. In at least one embodiment, the first side 204 may include a different hardness value than the second side 205.

By way of one or more embodiments, the leak resistant seal 203 may be made from a different material than a remaining portion of the container 200 that does not include the leak resistant seal 203. In at least one embodiment of the invention, the leak resistant seal 203 may include a different hardness value than the remaining portion of the container 200 that does not include the leak resistant seal 203.

One or more embodiments of the invention include forming the elastomer into the container 200 with a hardness of between 70 and 80 on a Shore A durometer scale. At least one embodiment of the invention includes forming the elastomer into the container 200 with a hardness of between 40 and 90 on a Shore A durometer scale, or in any case less than 100 Shore A.

Figure 4:
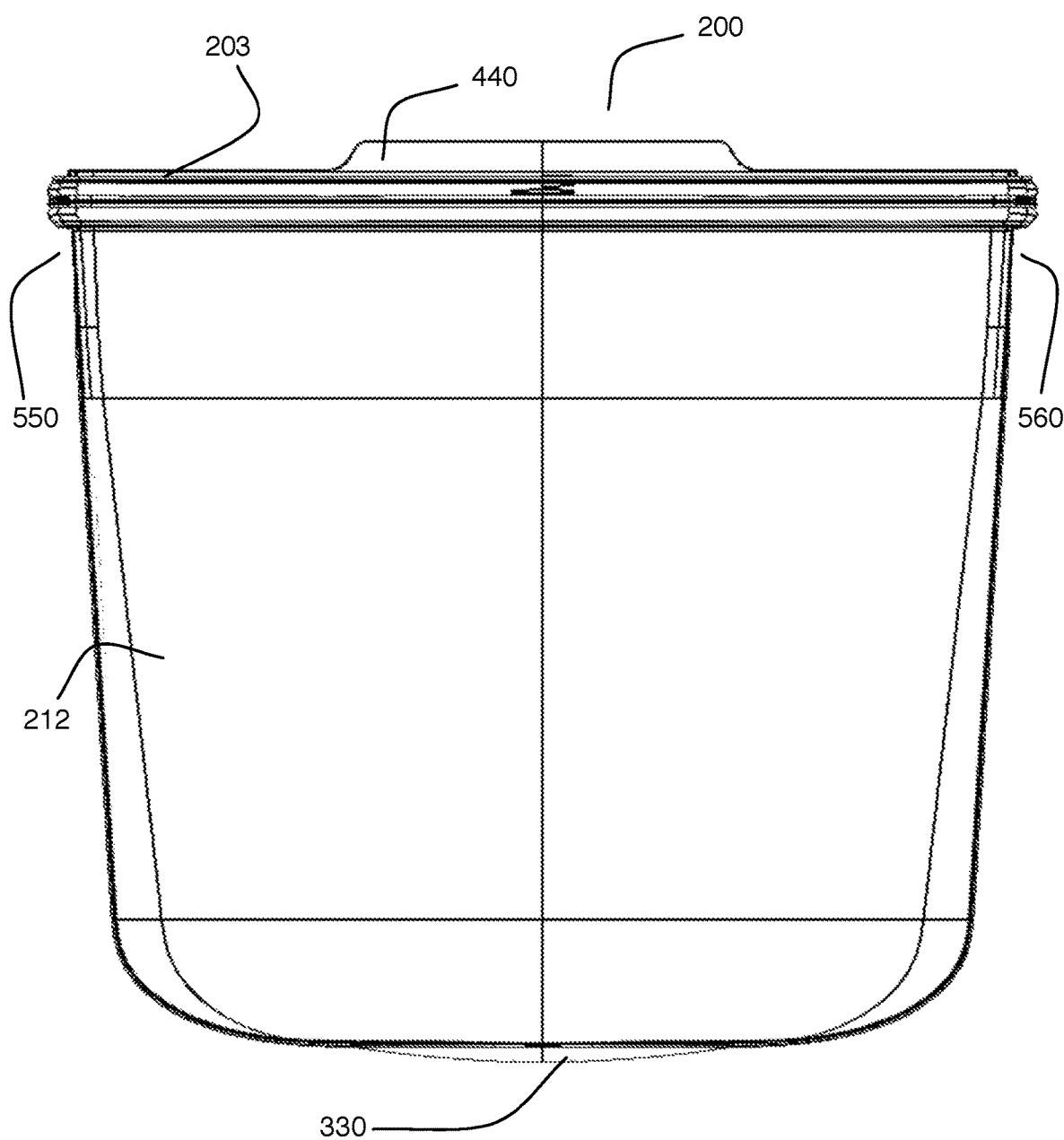
FIG. 4 shows a front view of the container formed inside out.
Figure 5:
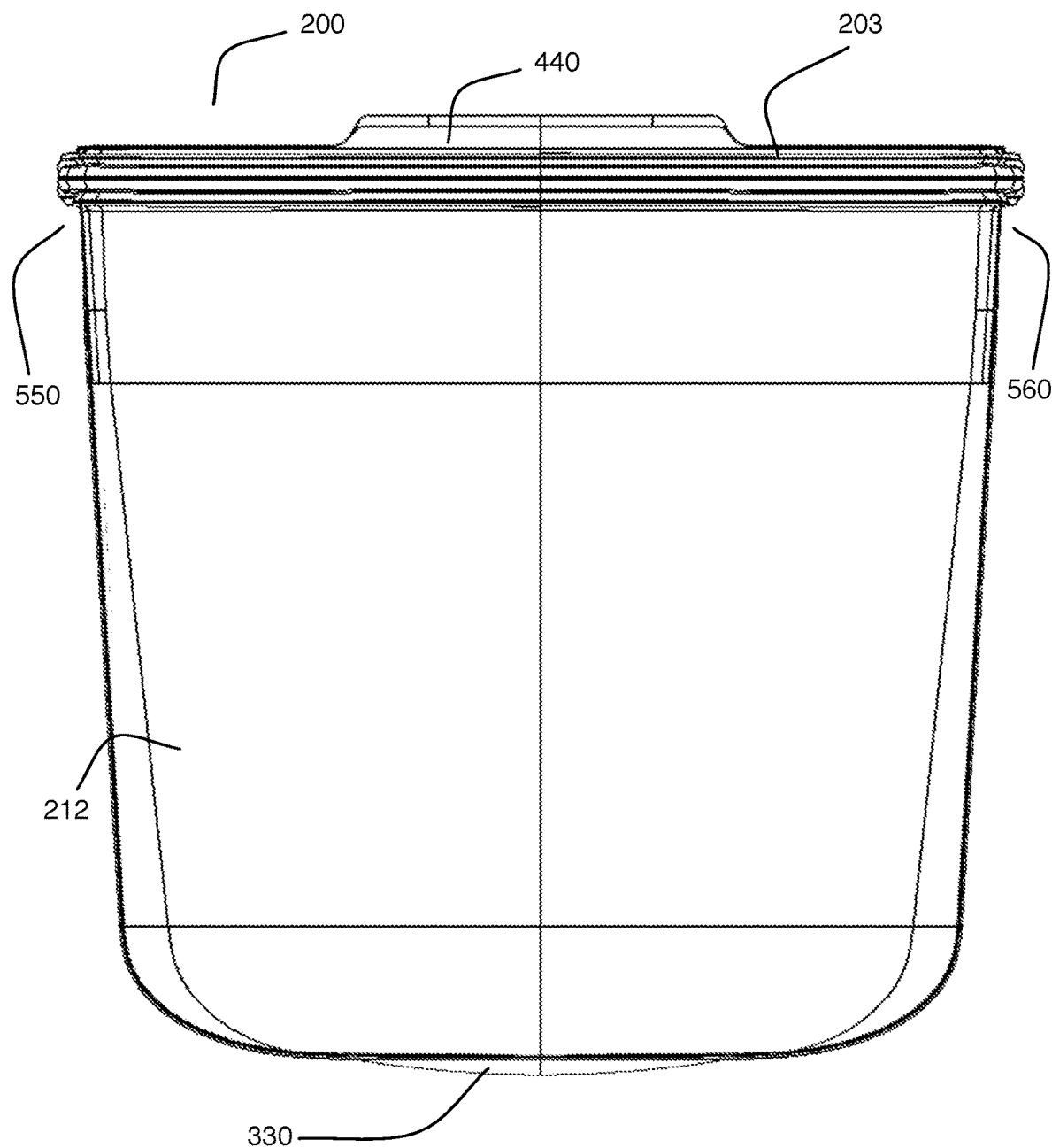
FIG. 5 shows a back view of the container formed inside out.

FIG. 4 shows a front view of the container before being inverted, according to one or more embodiments of the invention and FIG. 5 shows a back view of the container before being inverted, according to one or more embodiments of the invention.

At least one embodiment of the invention includes forming the container 200 with a width near the leak resistant seal 203 that is larger than an opposing width of the container 200 away from the leak resistant seal 203. In at least one embodiment of the invention, the container 200 may include a tab 440, wherein the tab 440 may include a tab side on each side of the container 200 and each side of the leak resistant seal 203.

In one or more embodiments of the invention, forming the container 200 includes forming the leak resistant seal 203 at opposing edges 550, 560 of the container 200 that are at least as thick as the leak resistant seal 203 between the opposing edges 550 560. By way of at least one embodiment, forming the elastomer into the container 200 includes liquid injection molding, plastic injection molding or compression molding. One or more embodiments may include forming the container by utilizing thermoplastic elastomers wherein forming the container includes melting the elastomer and injection molding the material.

One or more embodiments include utilizing an uncured, heat curable elastomer, wherein forming the elastomer into the container 200 includes heat curing the container 200.

At least one embodiment of the invention includes forming the container 200 in one molding step without attaching any material to the container 200 after the molding. This provides an extremely rapid method of manufacturing a leak resistant seal for storage and transport that does not require external structures or clips to hold the seal together.

In one or more embodiments, coupling the leak resistant seal 203 includes one or more of gluing, bonding and attaching the leak resistant seal 203 to the container 200 to couple the leak resistant seal 203 by co-molding the container 200 and the leak resistant seal 203 together or by over-molding the container 200 to the leak resistant seal 203 or by over-molding the leak resistant seal 203 to the container 200. This enables different types of materials to be utilized in the manufacturing of the container but requires more steps than the one step method described herein.

At least one embodiment of the invention includes forming the leak resistant seal 203 without bonding or gluing opposing sides 204, 205 of the leak resistant seal 203 at opposing ends of the leak resistant seal 203, for example at ends 620 and 621.

Figure 6:
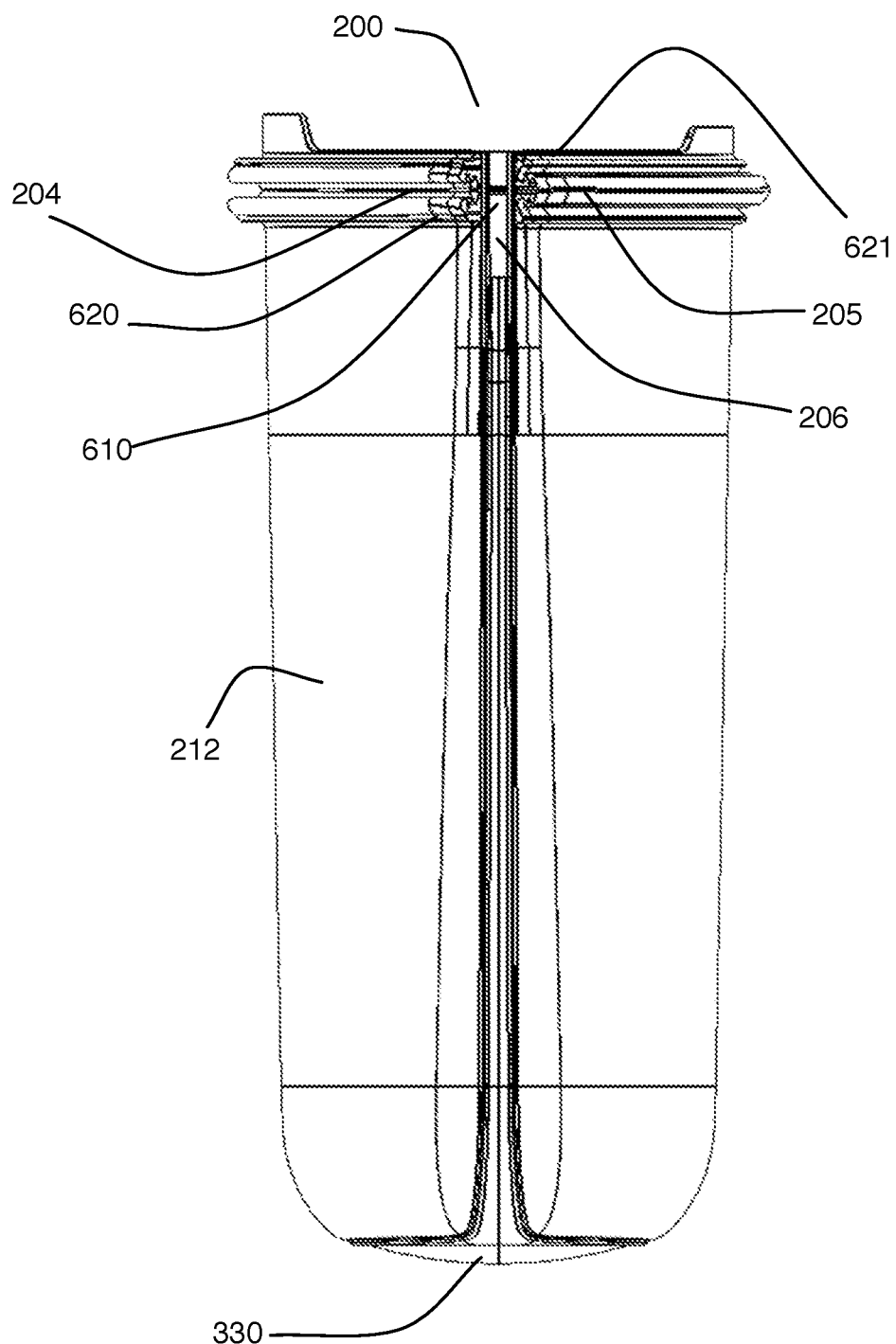
FIG. 6 shows a side view of the container formed inside out.

FIG. 6 shows a side view of the container before being inverted, according to one or more embodiments of the invention. In at least one embodiment of the invention, forming the inside portion 202 of the container 200 on the external surface 212 of the container 200 includes forming a gap 206 on the external surface 212 between the first side 204 of the leak resistant seal 203 and the second side 205 of the leak resistant seal 203 that engage each other after inverting the container 200. In at least one embodiment, the gap 206 may be a flat area between the first side 204 and the second side 205. In one or more embodiments, the gap 206 provides an abutment that each end of the first side 204 and second side 205 of the leak resistant seal 203 contact to keep the leak resistant seal 203 from leaking when applying an external force to the container 200. In one or more embodiments, the gap 206 is less than or equal to a thickness of the leak resistant seal 203. In this embodiment the seal portions on the ends compress and the relatively smaller gap elastically stretches and provides force to hold the seal together at the ends.

Figure 12:
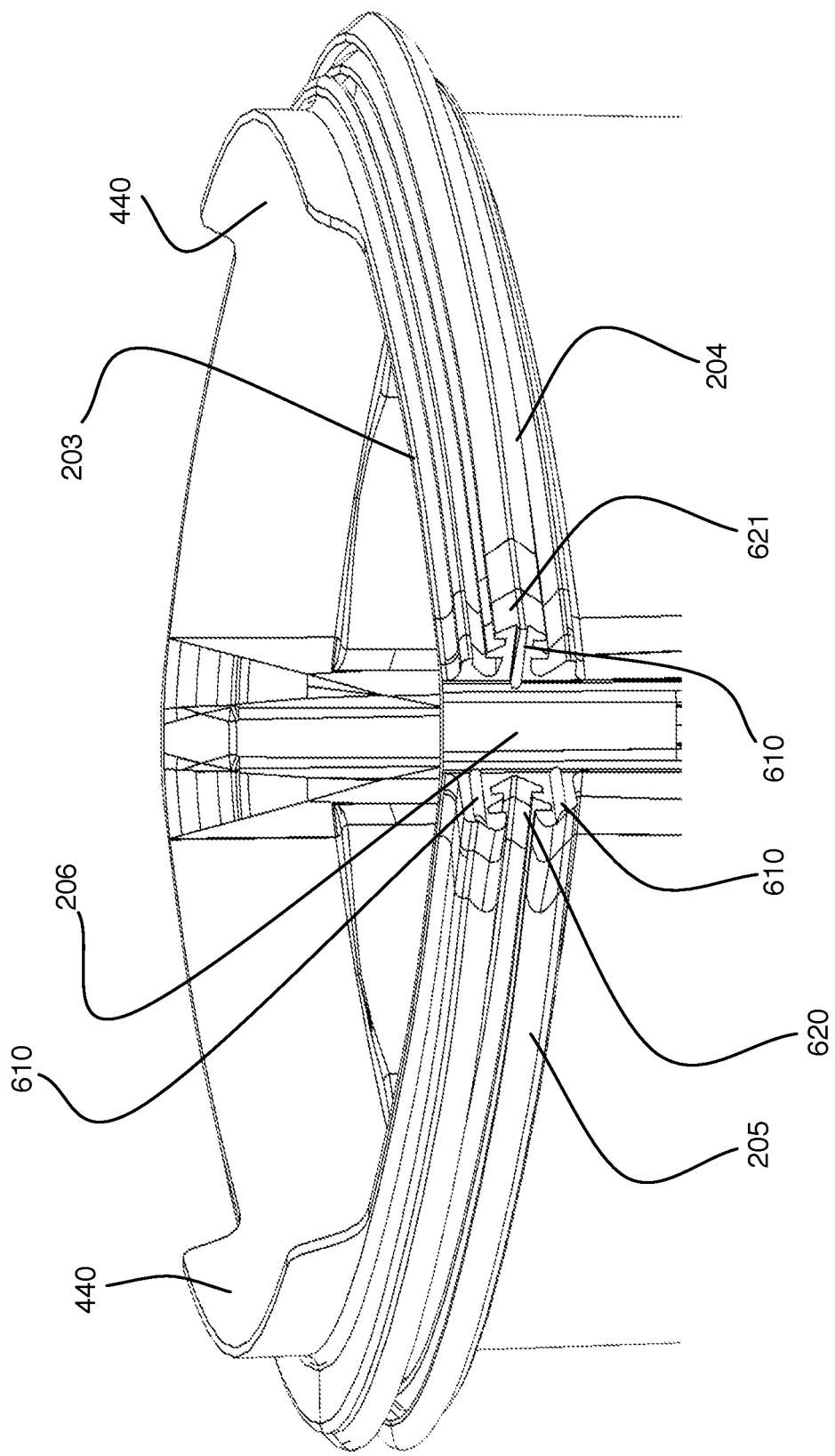
FIG. 12 shows the gap between the first and second side of the leak resistant seal and gap seals on the first side and the second side of the leak resistant seal.

By way of at least one embodiment of the invention, the gap 206 or each end of the first side 204 and second side 205 of the leak resistant seal 203 include at least one gap seal 610, wherein the at least one gap seal 610 is a protrusion, such as a raised rib, that protrudes out. For example, in at least one embodiment of the invention, the gap seal 610 protrudes from the gap 206 as shown in FIG. 6, or from each end of the first side 204 and second side 205 of the leak resistant seal 203 as shown in FIG. 12. According to at least one embodiment, the gap seal 610 is a protruding surface that creates a tight seal after the container 200 is inverted, through contact with the inner surface of the flat edge of the gap 206. This embodiment provides additional strength for the seal at the ends, increases the length of the path that any liquid must travel to escape from the container to provide a more leak resistant for example.

By way of at least one embodiment, each end of the first side 204 and second side 205 may include a gap seal, or one end of one of the first side 204 and the second side 205 may include a gap seal, or the gap 206 may include a gap seal, or any combination thereof.

In one or more embodiments of the invention, forming or coupling the leak resistant seal 203 includes utilizing a leak resistant seal 203 with a first seal portion 620 and a second seal portion 621 that couple with each other along a boundary to seal the container 200 and decouple from each other along the boundary to open the container 200. In at least one embodiment, the boundary is a line that defines an area between the first seal portion 620 and the second seal portion 621 that allows the first seal portion 620 to contact or to mate or couple or engage with the second seal portion 621.

According to one or more embodiments of the invention, the boundary defines a path of contact or coupling or mating or engagement between the first seal portion 620 and the second seal portion 621 that is at least 2 times a horizontal distance between a start of the path and an end of the path. In one or more embodiments, the path is at least 2.5 times the horizontal distance between the start of the path and the end of the path, or at least 3 times the horizontal distance between the start of the path and the end of the path, or at least 5 times the horizontal distance between the start of the path and the end of the path as described below.

Figure 15:
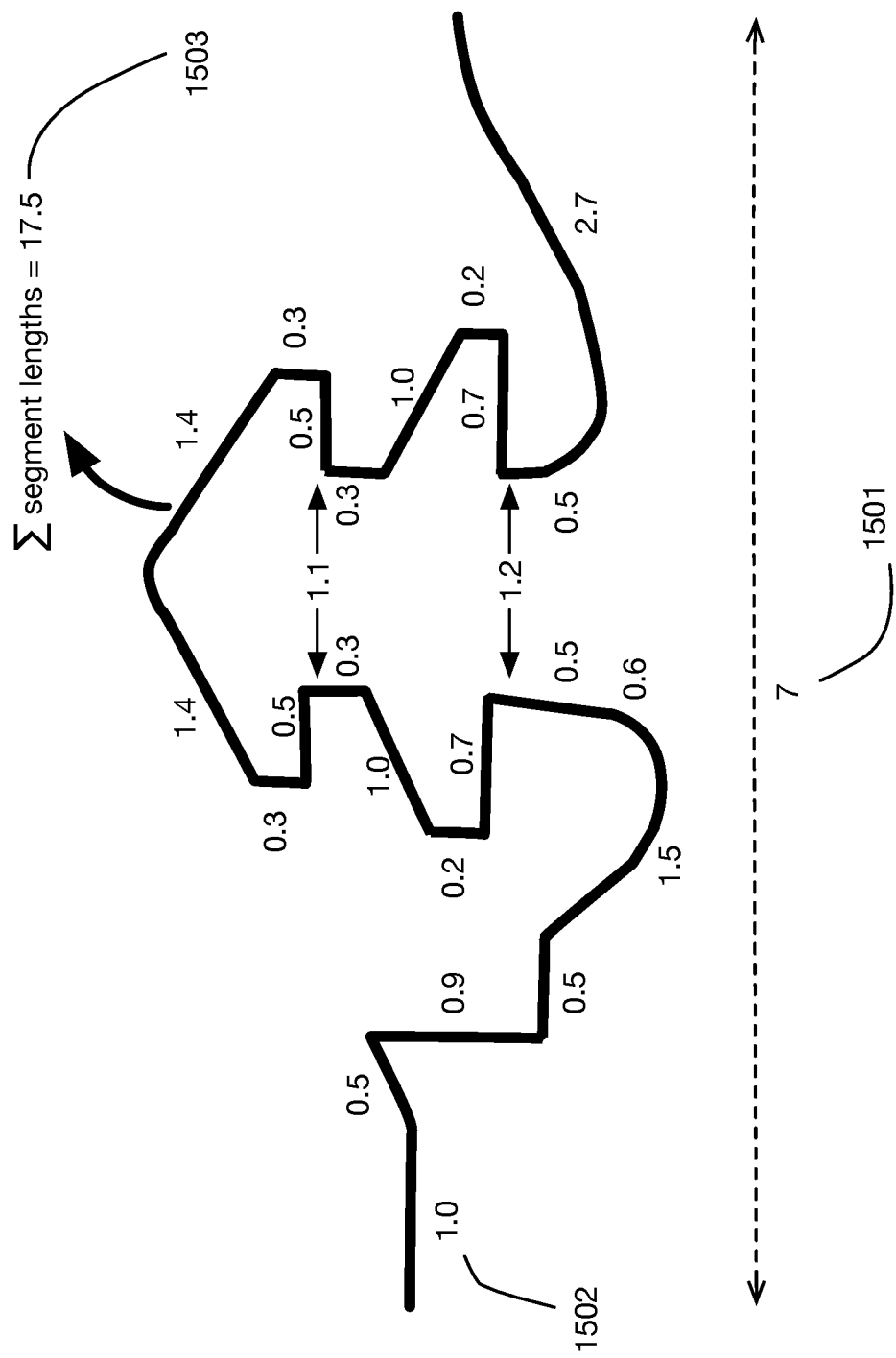
FIG. 15 shows an exemplary winding or wandering path calculation for an embodiment of the seal.

FIG. 15 shows an exemplary embodiment of the winding path of the seal with a leftmost horizontal length of the portion of the seal that is in contact with the corresponding portion on the other half of the seal. In this case, the length is 1.0. (The lengths shown are only relative to one another; they are not expressed in any specific units.) In the embodiment shown, the total length 1503 of the winding boundary path is 17.5. The horizontal distance 1501 between the start and end of the path is 7.0. Thus, the path length is approximately 2.5 times the horizontal distance. This ratio of path length to horizontal distance is a quantification of the extent to which the boundary path winds and changes directions, which contributes to the sealing force and the leak resistance. Some embodiments of the invention, have a boundary path length of at least twice the horizontal distance between the start and end of the path, for example if the horizontal portion of the contact area is larger or if the ridges on the seal are shorter, etc. For example, other embodiments may have a path length that is at least 3 times, or at least 4 times or at least 5 times the horizontal distance between the start of the path and the end of the path. Other metrics for measuring the seal may include measuring the path of the boundary for the seal starting at a point where the seal diverges from the base of the seal, or a flat portion of the seal, along the path of contact between each side of the seal and to a point next to the original starting point back on the flat portion of the seal. This metric for the winding path may yield ratios of at least 4, 5, 6, 7, 8, 9, or greater than 10. As shown if using only one protrusion as a male portion of the leak resistant seal, e.g., if the seal only is implemented with the upper portion of the Christmas tree as the male component, then the ratio is calculated as $A=(0.3+0.5+0.3+1.4)*2$ (for both sides since symmetrical)=5.0, divided by the width of the base=1.1 yields a ratio of 4.5. If calculating this metric using both levels of ridges, i.e., with the seal as shown, but with any type of side portion of the seal, or no side portion at all, then the ratio is calculated as above but with the lower portion to add, namely $B=(0.5+0.7+0.2+1.0)*2$ (since approximately symmetrical)=4.8. Hence, A+B, i.e., the total length of the full "Christmas tree" embodiment of the seal equals 9.8. The width of the lower portion of the seal that acts as the base portion for purposes of the calculation is 1.2 as shown, which results in a ratio of approximately 8. The longer the path, for a given base, the higher the ratio and generally the more leak resistant the seal is.

In at least one embodiment of the invention, the first seal portion 620 and the second seal portion 621 are at least 1 mm thick, or at least 2 mm thick, or at least 3 mm thick. The average thickness of the first and second seal portions are in general less than the maximum thickness. Maximum thickness is easier to measure, e.g., with a ruler, versus average thickness that is calculated by determining the volume and dividing by the width.

Figure 7:
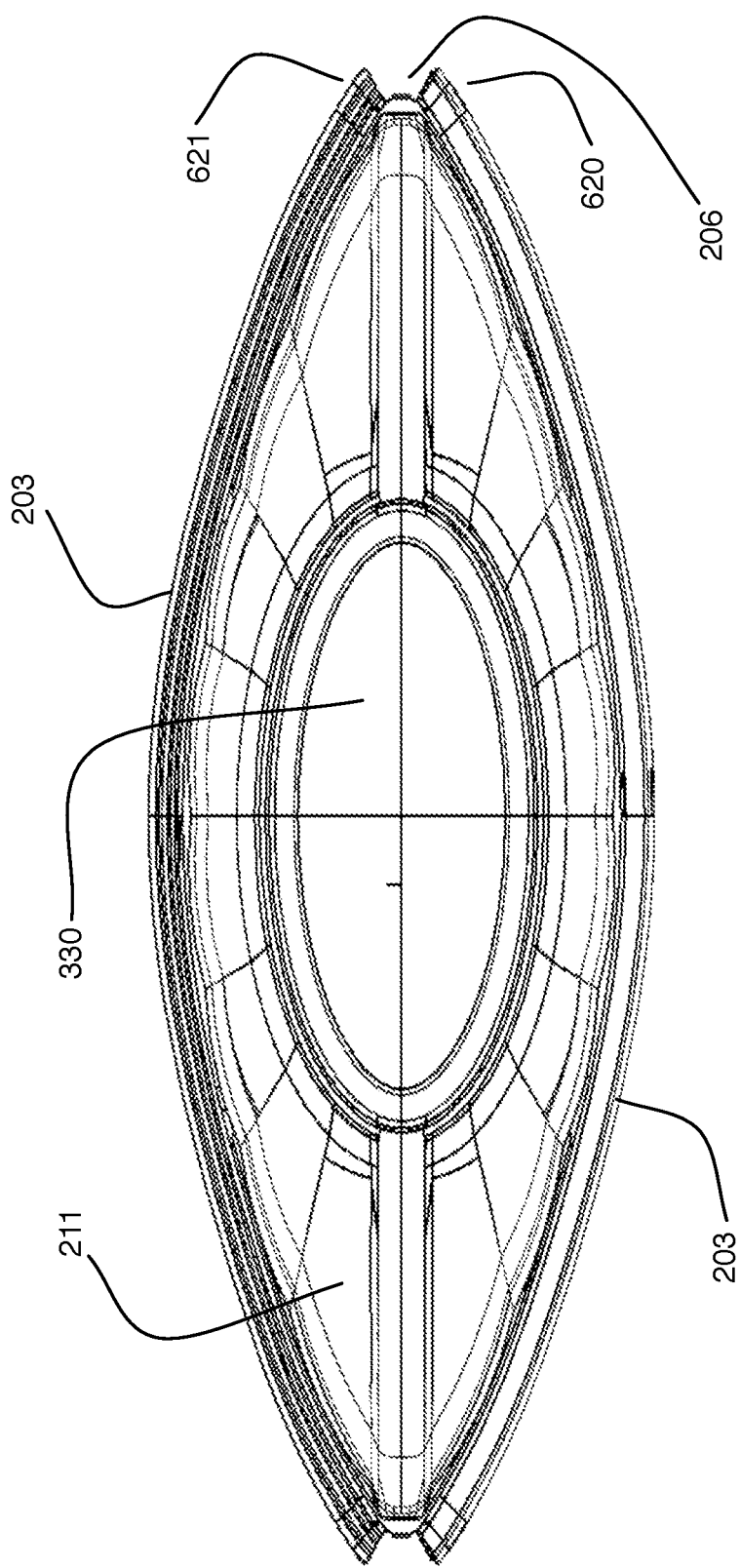
FIG. 7 shows a top view of the container formed inside out.
Figure 8:
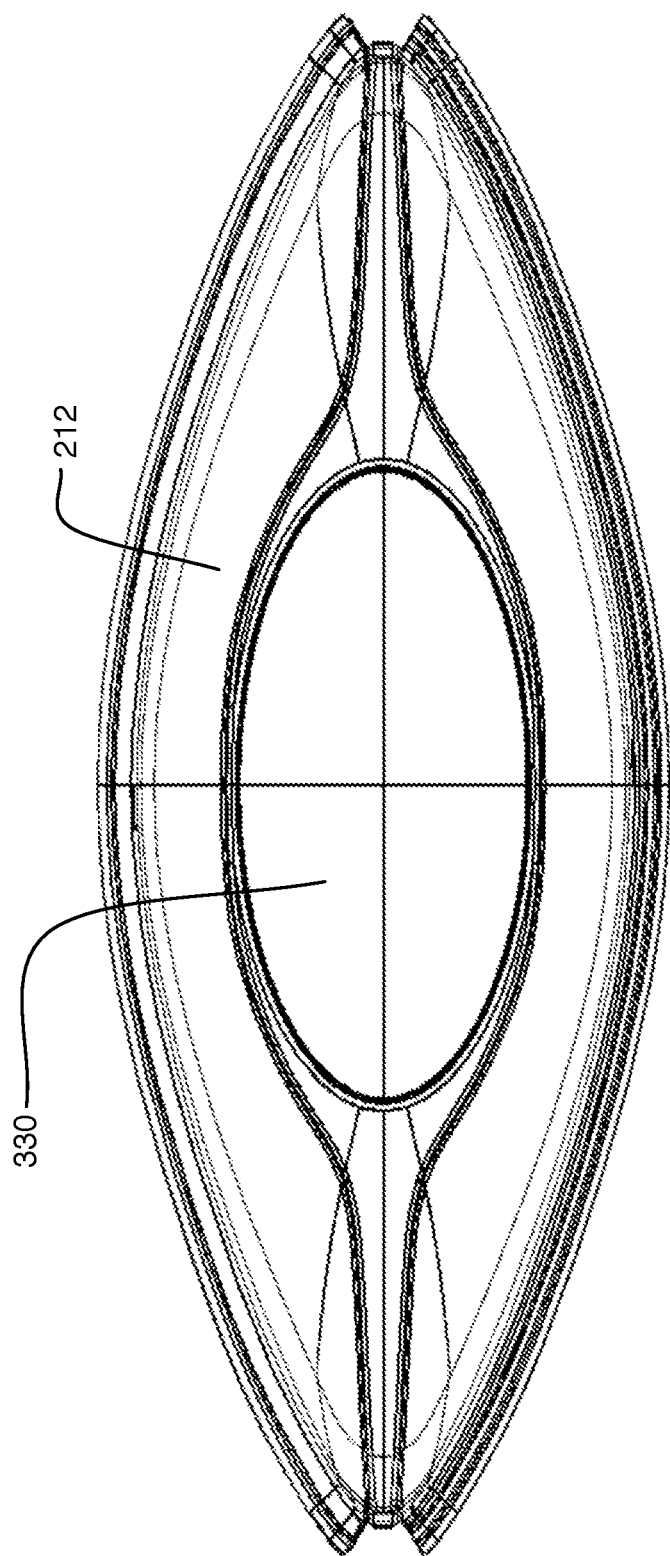
FIG. 8 shows a bottom view of the container formed inside out.

FIG. 7 shows a top view of the container before being inverted and FIG. 8 shows a bottom view of the container before being inverted, according to one or more embodiments of the invention.

At least one embodiment of the invention includes forming the container 200 with a thickness of 0.6 mm that increases to 1.8 mm at opposing sides 204, 205 of the leak resistant seal 203 at opposing ends of the container 203, for example at ends 550 and 560.

One or more embodiments of the invention include forming the container 200 with a thickness of between 0.3 and 0.9 mm that increases to 1.2 to 2.4 mm at opposing sides 204, 205 of the leak resistant seal 203 at opposing ends of the container 200, for example at ends 550 and 560.

Figure 9:
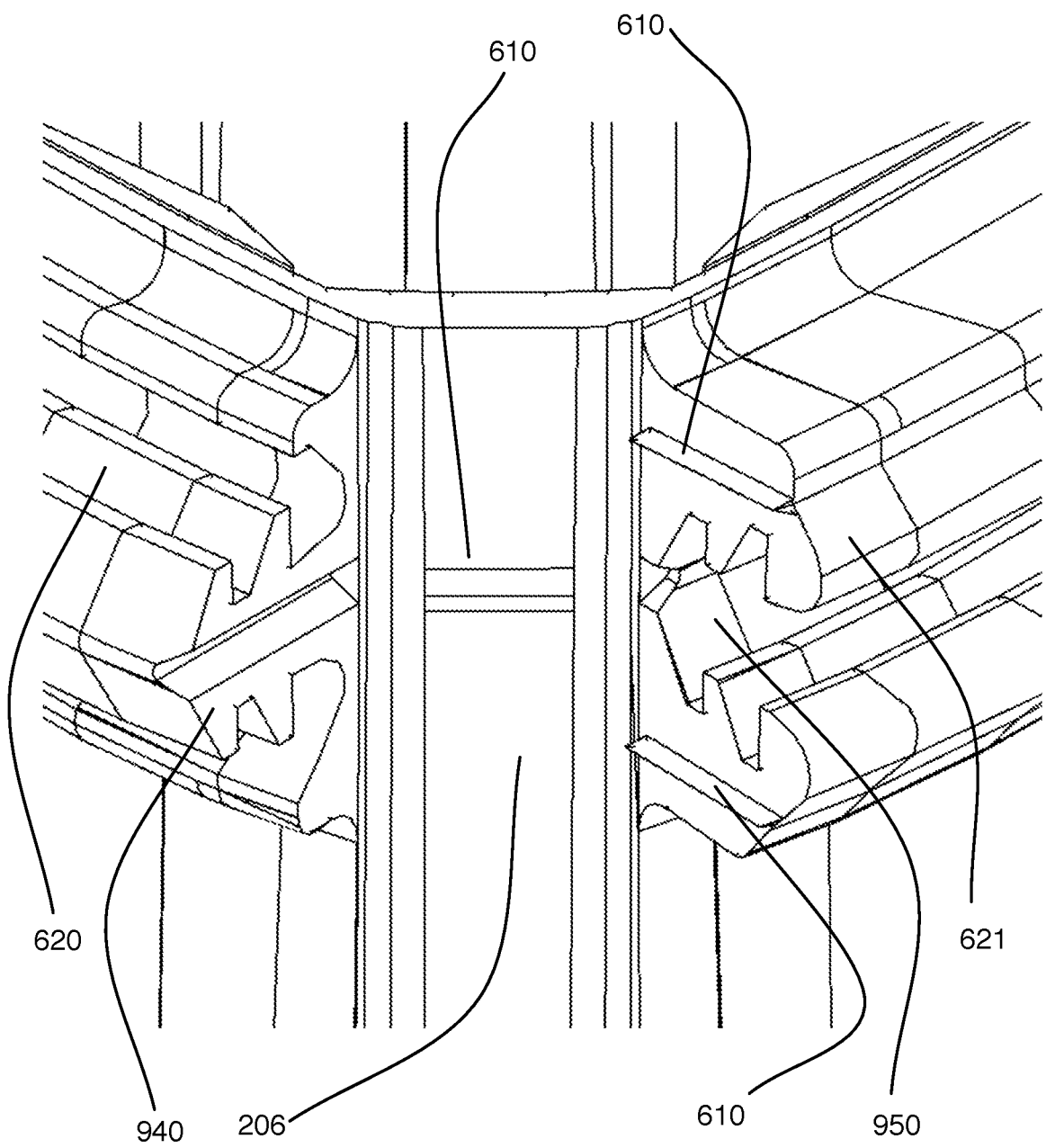
FIG. 9 shows a perspective view of ends of the leak resistant seal.
Figure 10:
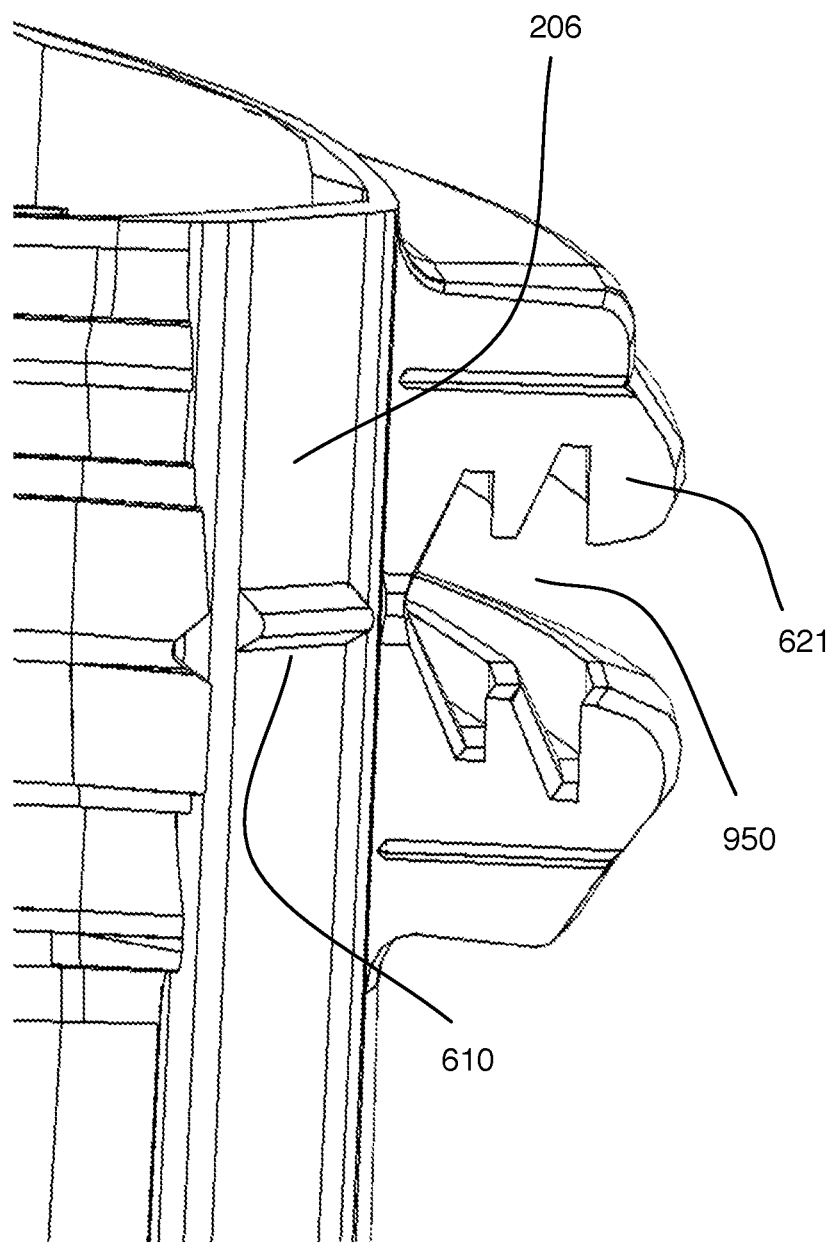
FIG. 10 shows a side view of a first side of the leak resistant seal.

FIG. 9 shows a perspective view of ends of the leak resistant seal before being inverted to engage one another, according to one or more embodiments of the invention. FIG. 10 shows a side view of a first side of the leak resistant seal before being inverted and FIG. 11 shows a side view of a second side of the leak resistant seal before being inverted, according to one or more embodiments of the invention.

Figure 11:
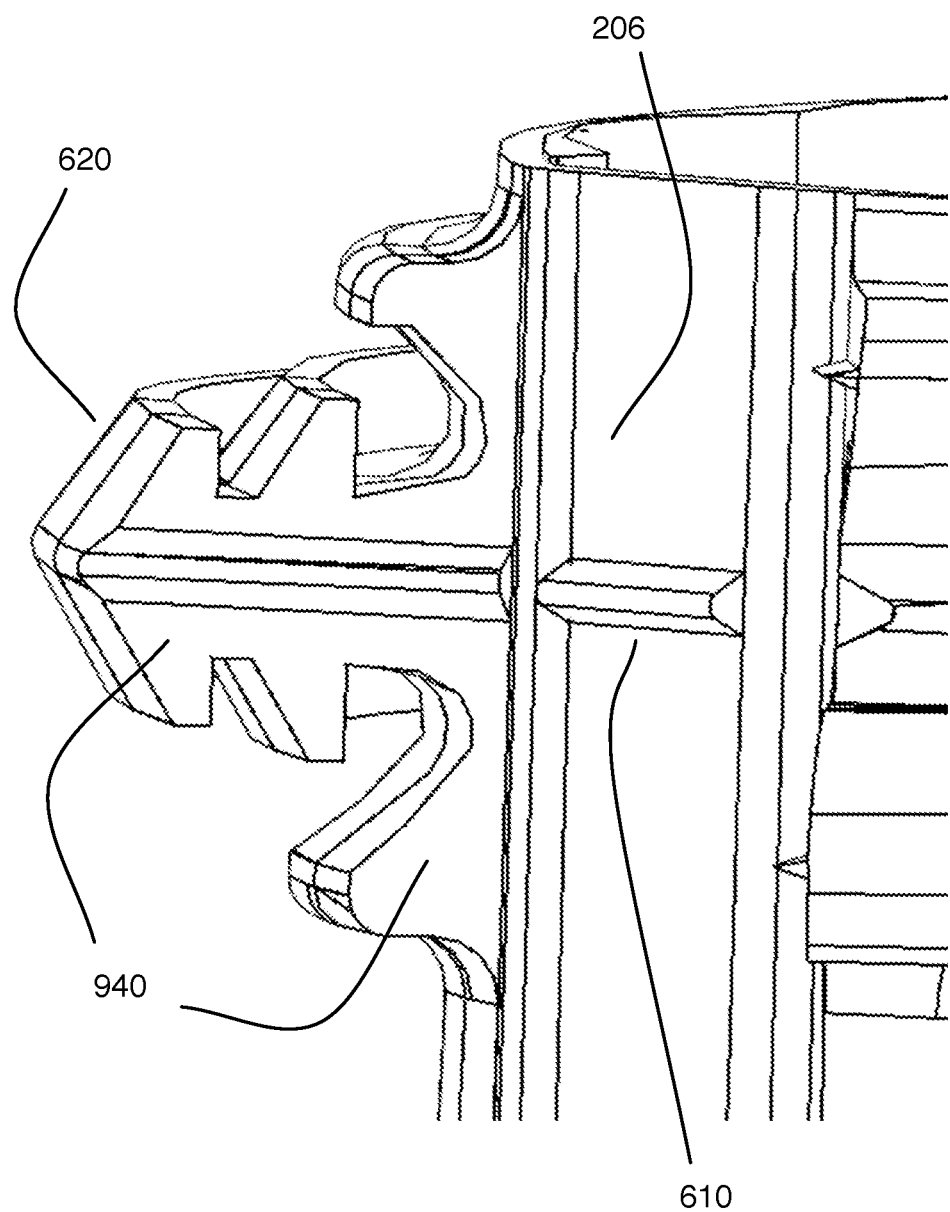
FIG. 11 shows a side view of a second side of the leak resistant seal.

As shown in FIG. 9, FIG. 10 and FIG. 11, according to one or more embodiments of the invention, the leak resistant seal 203 may include a gap seal 610 on the gap 206, and two gap seals 610 on the second seal portion 621, thus creating a three-level seal. In one or more embodiments, the three-level seal is created from each of the three gap seals 610, wherein each gap seal 610 contact and engage with the flat surface of the gap 206 such that the three-way seal is created via each gap seal 610 layered above another gap seal 610 vertically along the gap 206. In at least one embodiment of the invention, the first seal portion 620 and the second seal portion 621 include at least one corresponding protrusion or indentation 940, 950. Each protrusion or indentation shown may be a simple bump and groove or may include a geometric shape that is wider than another portion of the at least one corresponding protrusion or indentation 940, 950. This may include ridges or any other shape where the outer portion of the protrusion away from the surface on which the protrusion is located is larger than the corresponding entry to the indentation. Thus, the large male and female seal portions 620 and 621 may be produced on a smaller scale as gap seal components if desired.

In one or more embodiments of the invention, the gap 206 includes a gap seal 610 on a flat portion of the gap 206, and the first seal portion 620 includes a corresponding indentation that folds over and fits into the gap seal 610 of the gap 206, when inverting the container 200.

In at least one embodiment of the invention, the geometric shape of the at least one protrusion and/or indentation may be shaped as a "Christmas tree" and/or a double-headed arrow with varying widths at each head and/or a protrusion or indentation with multiple ridges that protrude out.

In one or more embodiments of the invention, utilizing the leak resistant seal 203 includes utilizing the protrusion or the indentation 940, 950 having a height of at least 2 mm and utilizing the geometric shape having a width of at least 1 mm thicker than the protrusion or the indentation 940, 950.

By way of at least one embodiment, utilizing the leak resistant seal 203 includes utilizing the protrusion or the indentation 940, 950 having a height of at least 2 mm and utilizing the geometric shape having a width of at least 2 mm thicker than the protrusion or the indentation 940, 950.

According to one or more embodiments, utilizing the leak resistant seal 203 includes utilizing two or more of the at least one corresponding protrusion 940 and the at least one corresponding indentation 950 in the leak resistant seal 203.

FIG. 12 shows gap seals on the first side and the second side of the leak resistant seal before being inverted, according to one or more embodiments of the invention. As shown in FIG. 12, by way of at least one embodiment, the gap 206 may not include a gap seal. In one or more embodiments, the side 204 and the second side 205 of the leak resistant seal 203, such as at the first seal portion 620 and at the second seal portion 621, may each include at least one gap seal 610, and the second seal portion 620 includes one gap seal 610, and the first seal portion 610 includes two gap seals 610. As such, in one or more embodiments, when inverting the container 200, the gap seals 610 shown in FIG. 12 fold over to contact the gap 206 in the center of the first seal portion 620 and the second seal portion 621, and thus create a three level seal where the gap 206 is thicker than the remaining portions of the outside of the container 200. By way of at least one embodiment, when the first seal portion 620 and the second seal portion 621 are folded over to invert the container 200, the thicker portion of the gap 206 with the gap seals 610 in contact therewith provide more force and are stronger than the remaining portion of the gap 206 and provide force to engage the first side 204 and the second side 205.

According to one or more embodiments of the invention, the container 200 includes wall edges on either side wall of the container 200 that includes the wall of the gap 206, wherein the wall of the gap 206 is thicker than the edges on either side of the container 200. In at least one embodiment of the invention, the wall thickness of the wall of the gap 206 is thickened and tapers smoothly on both sides of the container 200 away from the wall of the gap 206 to create the container side walls, such that the side walls of the container 200 are thinner than the walls of the gaps 206 on both opposing edges 550, 560 of the container 200. In one or more embodiments of the invention, the thicker portion of the container walls that includes the wall of the gap 206 includes additional material thickness on the internal surface 211 of the container 200, wherein such additional material thickness creates a clamping force when the container 200 is inverted, thus promoting and engaging a tight seal in the leak resistant seal 200.

By way of at least one embodiment of the invention, the gap 206 or each end of the first side 204 and second side 205 of the leak resistant seal 203 include at least one gap seal 610, wherein the at least one gap seal 610 is a protrusion that protrudes from the gap 206 as shown in FIG. 6, or from each end of the first side 204 and second side 205 of the leak resistant seal 203 as shown in FIG. 12. By way of at least one embodiment, each end of the first side 204 and second side 205 may include a gap seal, or one end of one of the first side 204 and the second side 205 may include a gap seal, or the gap 206 may include a gap seal, or any combination thereof.

According to one or more embodiments of the invention, the gap 206 may be thicker than a portion of the container 200, such that when the container 200 is inverted, a compressive force is developed from stretching of the material at the ends. This is the material thickness as looking into the figure, i.e., the thickness of the material in the gap region. This force, as applied, pulls the first seal portion 610 and the second seal portion 620 together at each and both ends of the seal portions, to provide a liquid tight barrier that is leak resistant for storage and transport, i.e., resists the leakage of liquids when external forces are applied to the container without requiring any external structure to hold the seal together. In addition, the width of the gap may be less than the height of element 621 for example to compress elements 620 and 621 together when inverted. Either the thickness of the material at the gap and/or the width of the gap may be made thicker and narrower alone or in combination to increase the sealing force at the ends of the leak resistant seal.

In at least one embodiment of the invention, end portions of the leak resistant seal may be thicker than a middle portion of the leak resistant seal, such that the edges of the leak resistant seal 206 are thicker than the remaining portions of the leak resistant seal 206.

FIG. 16A shows an alternate embodiment of a seal profile having a gap on the external portion of the container to make the container easier to open from the outside than from the inside, wherein the outside of the container is on the right side of the figure. FIG. 16B shows a second alternate embodiment of a seal profile having gaps, for example under one or more of the ridges when the seal is closed. As shown in both figures the initial point of contact 1620 is where the first seal portion 1601, as shown primarily a female component, contacts second seal portion 1602, primarily a male component. As the path of contact continues inward toward the center of the seal, a gap 1610 occurs where there is no contact between the first seal portion 1601 and second seal portion 1602. The path ends where the contact ends, i.e., when continuing to traverse the seal surfaces in one direction, specifically at 1630. In FIG. 16A, gap 1610 enables that right portion of the seal as shown to more easily open than the left portion. In FIG. 16B, the seal includes four gaps, which make the seal easier to open in general. One or more of the gaps shown in FIG. 16B are optional, such that the design may have gaps there or even above the uppermost point of the element 1602, i.e., a gap in element 1601, not shown for brevity.

In one or more embodiments, the leak resistant seal includes a path comprising a length along a surface of the first seal portion or the second seal portion that is at least 2 times a horizontal distance between a start of said path and an end of said path where an initial contact and final contact between said first seal portion or said second seal portion occurs respectively, e.g., between points 1620 and 1630 wherein the path includes the length of the surface of either first seal portion 1601 or second seal portion 1602. Thus, gaps still count in the calculation since liquid must traverse the gap and the path therefore in continuous in that some of the liquid will traverse the longest boundary face and some of the liquid will traverse the shortest boundary face generally on female and male seal components respectively. In one or more embodiments, the path, i.e., along the surface of either, (or even both) the first seal portion or second seal portion, is at least 2.5 times the horizontal distance between the start of the path 1620 and the end of said path 1630. In one or more embodiments, the path begins at a base portion of the leak resistant seal, i.e., where the contact point moves vertical at 1640, and wherein the path is at least 4.5 times the horizontal distance between the start of the path and the end of the path, i.e., where the path moves down vertically at 1650 with respect to a base width of the leak resistant seal, specifically where the leak resistant seal diverges from a flat portion of the leak resistant seal.

Definitions

Elastomer—A material which at room temperature can be stretched repeatedly to at least twice its original length and, upon immediate release of the stress, will return with force to its approximate original length.

Boundary—a length of a surface of either the first seal portion or second seal portion between an initial point of contact and final point of contact between the first seal portion and second seal portion when the leak resistant seal is closed. In a seal profile with no gaps, the boundary is the same length whether measured along the surface of element 1601 or 1602. In a seal profile with gaps, the boundary used for calculations of the path is either that length of the surface of either the first seal portion or second seal portion, wherein the female portion in general will have a larger boundary in a seal having gaps where no contact exists between some portions of the seal. Either the larger number or smaller number in this case can be utilized to show the length of the path. See also FIGS. 16A-B.

Leak resistant seal—A seal that resists leakage of liquids and solids from the container during storage and transport without the aid of an external structure to maintain the seal.

Coupled to—In terms of a single container, the container may be made in an integrated mold wherein all parts of the container are formed and therefore coupled to one another during the molding process, wherein the coupling material is the container material itself, i.e., an elastomer or plastic or thermoplastic elastomer. The single container may also be made from parts formed before coupling the parts together to form a single container. In either case a single container has multiple parts that are all coupled together, or they would fall apart.

Corresponding indentations—The shapes of the protrusions and recesses may be of the same shape where there are no gaps in the seal or may be of different shapes if the seal has gaps, e.g., when closed. In addition, the protrusions and recesses may be of different shapes so that when closed, there is at least one contact boundary along the length of the seal. In either case, the corresponding indentations for ridges may be of the same shape or different shape.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. An inside out method of manufacturing a container with a leak resistant seal comprising:
   forming an elastomer or a plastic or any combination thereof into a container inside out by
   forming an outside portion of said container on an internal surface of said container;
   forming an inside portion of said container on an external surface of said container;
   integrating a leak resistant seal configured to open and close said container on said external surface of said container wherein said leak resistant seal comprises a first seal portion and a second seal portion and at least one boundary of contact along said leak resistant seal wherein said first seal portion is configured to couple to said second seal portion to close said container and wherein said first seal portion is configured to decouple with said second seal portion to open said container;
- forming said container to enable inverting said external surface of said container and said leak resistant seal with said internal surface of said container such that said inside portion of said container and said leak resistant seal are located within said container and said outside portion of said container is located outside of said container;
- said leak resistant seal
  - providing access to said inside portion of said container when said leak resistant seal is disengaged, and
  - holding at least liquid internal to said container when applying an external force to said container without use of an external structure to keep said leak resistant seal closed when said leak resistant seal is engaged,
    - wherein when said leak resistant seal is engaged, said container is closed;
  - wherein said forming said inside portion of said container on said external surface of said container comprises forming a gap on said external surface between a first side of said leak resistant seal and a second side of said leak resistant seal configured to engage each other, wherein said gap provides an abutment that each end of said first side and second side of said leak resistant seal contact to keep said leak resistant seal from leaking when said applying said external force to said container occurs.

2. The method of claim 1, wherein said forming said container comprises
molding said container in an integrated mold
or
bonding two or more components together.

3. The method of claim 1, wherein a width of said gap is less than or equal to a thickness of said leak resistant seal or wherein a material thickness at said gap is thicker than a material thickness of at least one wall thickness of said container or wherein said gap couples each side of said leak resistant seal on each side of said gap together.

4. The method of claim 1, wherein said gap or each end of said first side and second side of said leak resistant seal comprise at least one gap seal, and wherein said at least one gap seal is a protrusion that protrudes from said gap or from each end of said first side and second side of said leak resistant seal.

5. The method of claim 1, wherein said first seal portion and said second seal portion are at least 1 mm thick.

6. The method of claim 5, wherein said first seal portion and said second seal portion are at least 2 mm thick.

7. The method of claim 5, wherein said first seal portion and said second seal portion are at least 3 mm thick.

8. The method of claim 1, wherein said leak resistant seal comprises a path comprising a length along a surface of said first seal portion or said second seal portion or said second seal portion that is at least 2 times a horizontal distance between a start of said path and an end of said path where an initial contact and final contact between said first seal portion or said second seal portion occurs respectively.

9. The method of claim 8, wherein said path is at least 2.5 times the horizontal distance between said start of said path and said end of said path.

10. The method of claim 8, wherein said path begins at a base portion of said leak resistant seal and wherein said path is at least 4.5 times the horizontal distance between said start of said path and said end of said path with respect to a base width of the leak resistant seal where said leak resistant seal diverges from a flat portion of said leak resistant seal.

11. The method of claim 1, wherein said first seal portion and said second seal portion comprise at least one corresponding protrusion or indentation comprising a geometric shape that is wider than another portion of said at least one corresponding protrusion or indentation and wherein said at least one corresponding protrusion or indentation comprise a same shape or a different shape.

12. The method of claim 11, wherein utilizing said leak resistant seal comprises utilizing said at least one corresponding protrusion or indentation comprising a height of at least 2 mm and utilizing said geometric shape comprising a width of at least 1 mm thicker than said at least one corresponding protrusion or said indentation.

13. The method of claim 11, wherein utilizing said leak resistant seal comprises utilizing said at least one corresponding protrusion or indentation comprising a height of at least 2 mm and utilizing said geometric shape comprising a width of at least 2 mm thicker than said at least one corresponding protrusion or said indentation.

14. The method of claim 11, wherein utilizing said leak resistant seal comprises utilizing two or more of said at least one corresponding protrusion and said at least one corresponding indentation in said leak resistant seal.

15. The method of claim 1, further comprising forming said container with a width near said leak resistant seal that is larger than an opposing width of said container away from said leak resistant seal.

16. The method of claim 1, wherein said first side comprises a different average thickness than said second side, or wherein said first side comprises a different material than said second side, or wherein said first side comprises a different hardness value than said second side.

17. The method of claim 1, wherein said leak resistant seal comprises a different material than a remaining portion of said container that does not include said leak resistant seal, or wherein said leak resistant seal comprises a different hardness value than said remaining portion of said container that does not include said leak resistant seal.

18. The method of claim 1, further comprising forming said elastomer into said container with a hardness of between 70 and 80 on a Shore A durometer scale.

19. The method of claim 1, further comprising forming said elastomer into said container with a hardness of between 40 and 90 on a Shore A durometer scale.

20. The method of claim 1, wherein said forming said container comprises forming said leak resistant seal at opposing edges of said container that are at least as thick as said leak resistant seal between said opposing edges.

21. The method of claim 1, wherein said forming said elastomer into said container comprises liquid injection molding, plastic injection molding, transfer molding or compression molding.

22. The method of claim 1, further comprising utilizing an uncured, heat curable elastomer and wherein said forming said elastomer into said container comprises heat curing said container.

23. The method of claim 1, further comprising forming said container in one molding step without attaching any material to said container after said molding step.

24. The method of claim 1, wherein said integrating said leak resistant seal comprises gluing, bonding or attaching said leak resistant seal to said container to couple said leak resistant seal by co-molding the container and the leak resistant seal together or by over-molding the container to the leak resistant seal or by over-molding the leak resistant seal to the container.

25. The method of claim 1, further comprising one or more of
   forming said leak resistant seal without bonding or gluing opposing sides of said leak resistant seal at opposing ends of said leak resistant seal; and
   forming a bottom on said container or flutes on said container or both, such that said container is configured to stand upright.

26. The method of claim 1, further comprising forming said container with a thickness of 0.6 mm that increases to 1.8 mm at opposing sides of said leak resistant seal at opposing ends of said container.

27. The method of claim 1, further comprising forming said container with a thickness of between 0.3 and 0.9 mm that increases to 1.2 to 2.4 mm at opposing sides of said leak resistant seal at opposing ends of said container.

28. The method of claim 1, wherein said leak resistant seal has a thickness or an average thickness of 0.25 cm or greater across any portion of contact of said first seal portion and said second seal portion when said leak resistant seal is closed.

29. The method of claim 1, wherein said leak resistant seal comprises at least one gap between two boundaries of contact selected from said at least one boundary of contact within said leak resistant seal.

30. The method of claim 1, further comprising inverting said external surface of said container and said leak resistant seal with said internal surface of said container such that said inside portion of said container and said leak resistant seal are located within said container and said outside portion of said container is located outside of said container.

* * * * *